US012602639B2

(12) United States Patent
Stone et al.

(10) Patent No.: US 12,602,639 B2
(45) **Date of Patent: *Apr. 14, 2026**

(54) METHODS AND SYSTEMS FOR TIME-VARIANT VARIABLE PREDICTION AND MANAGEMENT FOR SUPPLIER PROCUREMENT

(71) Applicant: Indie Tech Limited, Toronto (CA)

(72) Inventors: Sophia Gabrielle Contreras Stone, Toronto (CA); John Symeon Scoufaris, Toronto (CA)

(73) Assignee: Indie Tech Limited, Toronto (CA)

( * ) Notice: Subject to any disclaimer, the term of this patent is extended or adjusted under 35 U.S.C. 154(b) by 170 days.

This patent is subject to a terminal disclaimer.

(21) Appl. No.: 18/650,747

(22) Filed: Apr. 30, 2024

(65) Prior Publication Data

US 2024/0296406 A1 Sep. 5, 2024

Related U.S. Application Data

(63) Continuation of application No. 17/177,478, filed on Feb. 17, 2021, now Pat. No. 12,008,505.

(51) Int. Cl.
G06Q 10/0635 (2023.01)
G06F 18/214 (2023.01)
G06N 20/00 (2019.01)
G06Q 10/0835 (2023.01)

(52) U.S. Cl.
CPC ....... *G06Q 10/0635* (2013.01); *G06F 18/214* (2023.01); *G06N 20/00* (2019.01); *G06Q 10/0835* (2013.01)

(58) Field of Classification Search
CPC ............. G06Q 10/063; G06Q 10/0635; G06Q 10/0835; G06Q 10/08; G06Q 10/0841; G06N 20/00; G06F 18/214
See application file for complete search history.

(56) References Cited

U.S. PATENT DOCUMENTS

| | | | |
|---|---|---|---|
| 10,832,196 | B2 | 11/2020 | Almeida et al. |
| 2003/0200150 | A1 | 10/2003 | Westcott et al. |
| 2015/0363730 | A1 | 12/2015 | Crane et al. |
| 2017/0323241 | A1 | 11/2017 | Gauba et al. |

(Continued)

FOREIGN PATENT DOCUMENTS

CA 3154602 A1 * 5/2021 ........... H04L 9/3247

OTHER PUBLICATIONS

Dubey, Vivek Kumar, Jean-Paul Chavas, and Dharmaraj Veeramani. "Analytical framework for sustainable supply-chain contract management." International Journal of Production Economics 200 (2018): 240-261. (Year: 2018).*

*Primary Examiner* — William S Brockington, III
(74) *Attorney, Agent, or Firm* — Smart & Biggar LP

(57) ABSTRACT

Methods and systems for determining a time-variant supplier variable related to a contract. The method includes receiving, by a processor having a supplier variable module, a user historical data set, a global historical data set and an external data set. The method includes generating, by the supplier variable module, a set of outcomes; outputting, by the supplier variable module, the set of outcomes. The set of outcomes comprises at least one time-variant supplier variable. In an example, the supplier variable module includes a supplier variable model, which includes a machine learning model.

25 Claims, 10 Drawing Sheets

(56) References Cited

U.S. PATENT DOCUMENTS

| | | | |
|---|---|---|---|
| 2018/0315141 A1* | 11/2018 | Hunn | G06F 9/547 |
| 2019/0236694 A1 | 8/2019 | Balden | |
| 2020/0074370 A1 | 3/2020 | Oliveira Almeida et al. | |
| 2020/0143313 A1 | 5/2020 | Ohlsson et al. | |
| 2020/0394669 A1 | 12/2020 | Meehan et al. | |
| 2020/0410001 A1* | 12/2020 | Sarkissian | G06F 3/0482 |
| 2021/0173711 A1 | 6/2021 | Crabtree et al. | |
| 2021/0201013 A1* | 7/2021 | Makhija | G06V 30/414 |
| 2022/0058554 A1* | 2/2022 | Makhija | G06N 3/08 |
| 2022/0398680 A1* | 12/2022 | Wodetzki | G06N 20/00 |

* cited by examiner

800

6-month Contract Between Enterprise and First-time Supplier
Time: 0 / Score A for Supplier Contract A

| Models | Input | Initial Output Value | Output Type | Output 1 | Change of Value | Risk Score Type | Initial Score | Risk Score 1 | Initial Grade | Grade 1 |
|---|---|---|---|---|---|---|---|---|---|---|
| Model 1: Rate Card | Pricing factors | | Price | Currency Value | | | | Value out of 100 | | Letter Grade |
| Model 2.1: Counter-Party Supplier Risk | Assessment Factors | | Heat Map Position Coordinates | Heatmap Value | | Counter-Party Score | | Value out of 100 | | Letter Grade |
| Model 2.2: Counter-Party Enterprise Risk | Assessment Factors | | Heat Map Position Coordinates | Heatmap Value | | Counter-Party Score | | Value out of 100 | | Letter Grade |
| Model 3: Contract Risk | Contract Terms | | Contract Decomposition and Attribution | Risk Attribution | | Attribution Scores | | Value out of 100 | | Letter Grade |
| Model 4: Supply Risk | Model Values | | Price | Currency Value | | Supply Score | | Value out of 100 | | Letter Grade |
| Model 5: Enterprise Supplier Risk | Model Values | | Value at Risk | Currency Value | | Enterprise Risk | | Value out of 100 | | Letter Grade |

FIGURE 10

Time: Month 1 for Supplier Contract A

| Models | Input | Output Value 2 (Previous Score before new | Output Type | Output 3 | Change of Value | Risk Score Type | Previous Risk Score 2 | New Risk Score 3 | Previous Grade 2 | New Grade 3 |
|---|---|---|---|---|---|---|---|---|---|---|
| Model 1: Rate Card | Pricing factors | | Price | Currency Value | | | | Value out of 100 | | Letter Grade |
| Model 2.1: Counter-Party Supplier Risk | Assessment Factors | | Heat Map Position Coordinates | Heatmap Value | | Counter-Party Score | | Value out of 100 | | Letter Grade |
| Model 2.2: Counter-Party Enterprise Risk | Assessment Factors | | Heat Map Position Coordinates | Heatmap Value | | Counter-Party Score | | Value out of 100 | | Letter Grade |
| Model 3: Contract Risk | Contract Terms | | Contract Decomposition and Attribution | Risk Attribution | | Attribution Scores | | Value out of 100 | | Letter Grade |
| Model 4: Supply Risk | Model Values | | Price | Currency Value | | Supply Score | | Value out of 100 | | Letter Grade |
| Model 5: Enterprise Supplier Risk | Model Values | | Value at Risk | Currency Value | | Enterprise Risk | | Value out of 100 | | Letter Grade |

FIGURE 11

Time: Month 3 for Supplier Contract A

| Models | Input | Output Value 3 (Previous Score before new) | Output Type | Output 4 | Change of Value | Risk Score Type | Previous Risk Score 3 | New Risk Score 4 | Previous Grade 3 | New Grade 4 |
|---|---|---|---|---|---|---|---|---|---|---|
| Model 1: Rate Card | Pricing factors | | Price | Currency Value | | | | | | Letter Grade |
| Model 2.1: Counter-Party Supplier Risk | Assessment Factors | | Heat Map Position Coordinates | Heatmap Value | | Counter-Party Score | | Value out of 100 | | Letter Grade |
| Model 2.2: Counter-Party Enterprise Risk | Assessment Factors | | Heat Map Position Coordinates Contract | Heatmap Value | | Counter-Party Score | | Value out of 100 | | Letter Grade |
| Model 3: Contract Risk | Contract Terms | | Decomposition and Attribution | Risk Attribution | | Attribution Scores | | Value out of 100 | | |
| Model 4: Supply Risk | Model Values | | Price | Currency Value | | Supply Score | | Value out of 100 | | Letter Grade |
| Model 5: Enterprise Supplier Risk | Model Values | | Value at Risk | Currency Value | | Enterprise Risk | | Value out of 100 | | Letter Grade |

FIGURE 12

Time: Month 6 for Supplier Contract A

| Models | Input | Output Value 4 (Previous Score before new) | Output Type | Output 5 | Change of Value | Risk Score Type | Previous Risk Score 4 | New Risk Score 5 | Previous Grade 4 | New Grade 5 |
|---|---|---|---|---|---|---|---|---|---|---|
| Model 1: Rate Card | Pricing factors | | Price | Currency Value | | | | | | Letter Grade |
| Model 2.1: Counter-Party Supplier Risk | Assessment Factors | | Heat Map Position Coordinates | Heatmap Value | | Counter-Party Score | | Value out of 100 | | Letter Grade |
| Model 2.2: Counter-Party Enterprise Risk | Assessment Factors | | Heat Map Position Coordinates | Heatmap Value | | Counter-Party Score | | Value out of 100 | | Letter Grade |
| Model 3: Contract Risk | Contract Terms | | Contract Decomposition and Attribution | Risk Attribution | | Attribution Scores | | Value out of 100 | | |
| Model 4: Supply Risk | Model Values | | Price | Currency Value | | Supply Score | | Value out of 100 | | Letter Grade |
| Model 5: Enterprise Supplier Risk | Model Values | | Value at Risk | Currency Value | | Enterprise Risk | | Value out of 100 | | Letter Grade |

FIGURE 13

METHODS AND SYSTEMS FOR TIME-VARIANT VARIABLE PREDICTION AND MANAGEMENT FOR SUPPLIER PROCUREMENT

CROSS-REFERENCE TO RELATED APPLICATIONS

The present application is a continuation of U.S. patent application Ser. No. 17/177,478 filed Feb. 17, 2021, entitled "METHODS AND SYSTEMS FOR TIME-VARIANT VARIABLE PREDICTION AND MANAGEMENT FOR SUPPLIER PROCUREMENT", the entire contents of which are incorporated herein by reference.

TECHNICAL FIELD

Example embodiments relate to assessing and monitoring supplier procurement contracts, in particular to systems and methods for predicting and managing time-variant supplier variables for supplier procurement.

BACKGROUND

The current state of supplier procurement, in particular supplier risk, is somewhat rudimentary. For examples, some conventional risk assessments may resemble underwriting activity (where extensive work may be performed at the inception of an agreement, then little to no ongoing assessments are conducted) and are manually performed on a supplier specific basis.

Additionally, in recent years, with ongoing risk tied to supplier procurement data models and the supply chain, regulatory bodies are scrutinizing the way certain institutions track and monitor supplier procurement contracts. Current guidelines provide a framework for how the regulatory bodies would like to see supplier contracts handled; however, much like many other areas of procurement, the contract variables remains difficult to quantify and monitor. For example, regulatory bodies have provided guidelines indicating how supplier risk should be measured; however compared to other, more robust, risk frameworks, supplier risk still largely relies on qualitative risk assessments.

Many aspects of a supplier procurement contract will vary throughout the duration of the contract and there is a need to monitor and predict certain supplier contract variables throughout the lifecycle of the contract, not just at the beginning.

Accordingly, there is a need to incorporate traditional supplier assessments while also adding a robust time-variant supplier variable assessment framework to enable continuous prediction and monitoring of the suppliers, services, performance, and quality of delivery. In addition to certain mathematical models, there is a need to incorporate artificial intelligence into the continuous monitoring of time-variant supplier variables within the system and also while incorporating external data in order to better predict time-variant supplier variables and trends tied to all parties bound to a contract. In particular, there is a need to provide artificial intelligence to improve the monitoring of variables that are difficult to quantify, such as supplier risk.

SUMMARY

Example embodiments relate to systems and methods for predicting and managing time-variant supplier variables for supplier procurement. Example embodiments of the system and methods include the following: i) Evaluation of supplier specific information, global marketplace information, enterprise data, and contract specific information to monitor time-variant variables of the procurement contract, such as supplier risk; and ii) Comparing and analyzing the time-variant supplier variables over time using a supplier variable model, that can include a machine learning model, to provide a user with a real time assessment of the performance of the contract.

A technical effect of the systems and methods described herein is that a user can monitor certain time-variant variables related to supplier procurement contracts throughout the duration of the contract.

Another effect of the systems and methods is that a user can be notified when the time-variant variables reach or pass a respective threshold value, or when there is a significant change in the variables, such that an action should be taken by the user in relation to the supplier procurement contract.

Example embodiments relate to systems and methods for generating an online marketplace application for connecting suppliers and enterprises of procurement contracts. The system and methods include i) Generating and outputting monitor time-variant variables of the procurement contract, such as supplier risk; and ii) Maintaining a list of approved suppliers for the marketplace application. In some examples, the online marketplace application also maintains a list of approved enterprises.

In an example embodiment includes a method comprising: receiving, by a processor, a user historical data set; receiving, by the processor, a global historical data set; receiving, by the processor, an external data set; and generating, by a supplier variable module of the processor using the user historical data set, the global historical data set, and the external data set, a set of outcomes including at least one time-variant supplier variable.

Another example embodiment includes a method comprising: receiving, by a processor, a user historical data set; receiving, by the processor, a global historical data set; receiving, by the processor, an external data set; and generating, by a supplier variable module of the processor using the user historical data set, the global historical data set, and the external data set, a set of outcomes including at least one time-variant supplier variable; wherein the at least one time-variant supplier variable relates to a supplier contract or potential supplier contract.

Another example embodiment includes a method comprising: receiving, by a processor, a user historical data set; receiving, by the processor, a global historical data set; receiving, by the processor, an external data set; and generating, by a supplier variable module of the processor using the user historical data set, the global historical data set, and the external data set, a set of outcomes including at least one time-variant supplier variable; wherein the at least one time-variant supplier variable includes at least one of a counterparty supplier risk, a counterparty enterprise risk, a contract risk, a supply risk, or a market price.

Another example embodiment includes a method comprising: receiving, by a processor, a user historical data set; receiving, by the processor, a global historical data set; receiving, by the processor, an external data set; and generating, by a supplier variable module of the processor using the user historical data set, the global historical data set, and the external data set, a set of outcomes including at least one time-variant supplier variable; wherein the at least one time-variant supplier variable includes an enterprise supplier risk.

Another example embodiment includes a method comprising: receiving, by a processor, a user historical data set; receiving, by the processor, a global historical data set; receiving, by the processor, an external data set; and generating, by a supplier variable module of the processor using the user historical data set, the global historical data set, and the external data set, a set of outcomes including at least one time-variant supplier variable; wherein the at least one time-variant supplier variable includes a counterparty supplier risk, a counterparty enterprise risk, a contract risk, a supply risk, and a market price, wherein the enterprise supplier risk is generated by the supplier variable module using the counterparty supplier risk, the counterparty enterprise risk, the contract risk, the supply risk, and the market price.

Another example embodiment includes a method comprising: receiving, by a processor, a user historical data set; receiving, by the processor, a global historical data set; receiving, by the processor, an external data set; and generating, by a supplier variable module of the processor using the user historical data set, the global historical data set, and the external data set, a set of outcomes including at least one time-variant supplier variable; wherein the at least one time-variant supplier variable includes a counterparty supplier risk, a counterparty enterprise risk, a contract risk, a supply risk, a market price, or an enterprise supplier risk, wherein the supplier variable module comprises at least one of a counterparty supplier risk model to generate the counterparty supplier risk, a counterparty enterprise risk model to generate the counterparty enterprise risk, a contract risk model to generate the contract risk, a supply risk model to generate the supply risk, a market price model to generate the market price, or an enterprise supplier risk model to generate the enterprise supplier risk.

Another example embodiment includes a method comprising: receiving, by a processor, a user historical data set; receiving, by the processor, a global historical data set; receiving, by the processor, an external data set; and generating, by a supplier variable module of the processor using the user historical data set, the global historical data set, and the external data set, a set of outcomes including at least one time-variant supplier variable; executing, by the processor, a marketplace application which connects enterprises with respective approved suppliers, wherein a local database or a remote database accessible by the processor includes a list of the respective approved suppliers for each enterprise of the marketplace application.

Another example embodiment includes a method comprising: receiving, by a processor, a user historical data set; receiving, by the processor, a global historical data set; receiving, by the processor, an external data set; and generating, by a supplier variable module of the processor using the user historical data set, the global historical data set, and the external data set, a set of outcomes including at least one time-variant supplier variable; executing, by the processor, a marketplace application which connects enterprises with respective approved suppliers, wherein a local database or a remote database accessible by the processor includes a list of the respective approved suppliers for each enterprise of the marketplace application; wherein the at least one time-variant supplier variable relates to a supplier; the method further comprising: receiving; by the processor, a threshold value; comparing; by the supplier variable module, the at least one time-variant supplier variable to the threshold value; detecting, by the supplier variable module, when the at least one time-variant supplier variable reaches the threshold value; adding, by the processor, the supplier to the list of the approved suppliers.

Another example embodiment includes a method comprising: receiving, by a processor, a user historical data set; receiving, by the processor, a global historical data set; receiving, by the processor, an external data set; and generating, by a supplier variable module of the processor using the user historical data set, the global historical data set, and the external data set, a set of outcomes including at least one time-variant supplier variable; wherein the set of outcomes is related to a first point in time; the method further comprising: generating, by the supplier variable module, a second set of outcomes; wherein the second set of outcomes are related to a second point in time; and wherein the second set of outcomes includes the at least one time-variant supplier variable.

Another example embodiment includes a method comprising: receiving, by a processor having an enterprise supplier risk model, a counterparty risk; receiving, by the processor, a contract risk; receiving, by the processor, a supply risk; receiving, by the processor, a market price; and generating, by the enterprise supplier risk model, using the counterparty risk, the contract risk, the supply risk and the market price, a set of outcomes including an enterprise supplier risk.

Another example embodiment includes a method comprising: receiving, by a processor having a supply risk model, a set of market based inputs; receiving, by the processor, a market price; receiving, by the processor, a set of contract attributes; and generating, by the supply risk model, using the set of market based inputs, the set of contract attributes and the market price, a set of outcomes including a supply risk.

Another example embodiment includes a method comprising: receiving, by a processor having a contract risk model, a counterparty risk; receiving, by the processor, a set of contract attributes; receiving, by the processor, a set of updates to market and contract attributes; and generating, by the contract risk model, using the counterparty risk, the set of contract attributes and the set of updates to market and contract attributes, a set of outcomes including a contract risk.

Another example embodiment includes method comprising: receiving, by a processor having a counterparty enterprise risk model, a qualitative supplier risk assessment; receiving, by the processor, a first counterparty enterprise risk; receiving, by the processor, a second counterparty enterprise risk; and generating, by the counterparty enterprise risk model, using the qualitative supplier risk assessment, the first counterparty enterprise risk and the second counterparty enterprise risk, a set of outcomes including a final counterparty enterprise risk.

Another example embodiment includes a method comprising: receiving, by a processor having a counterparty supplier risk model, a qualitative supplier risk assessment; receiving, by the processor, a first counterparty supplier risk; receiving, by the processor, a second counterparty supplier risk; and generating, by the counterparty supplier risk model, using the qualitative supplier risk assessment, the first counterparty suppler risk and the second counterparty supplier risk, a set of outcomes including a final counterparty supplier risk.

Another example embodiment includes A method comprising: receiving, by a processor having a market price model, a set of market based inputs for supply and demand; and generating, by the market price model, using the set of market based inputs for supply and demand, a set of outcomes including a contract risk, a supply risk and a market price.

Another example embodiment includes a system, comprising a local database including first sets of data related to a supplier contract; a remote database including second sets of data related to a supplier contract; a server including a processor having a supplier variable module, the processor configured to receive the first sets of data from the local database and the second sets of data from the remote database, the processor configured to: compile, by the supplier variable module, the first sets of data and the second sets of data into a user historical data set, a global historical data set and an external data set; and generate, by the supplier variable module, a set of outcomes including at least one time-variant supplier variable.

BRIEF DESCRIPTION OF THE DRAWINGS

Reference will now be made, by way of example, to the accompanying drawings which show example embodiments, and in which:

FIG. 10 is a table depicting an exemplary output of the system at the beginning of a 6 month contract, i.e. 0 months into the contract.

FIG. 11 is a table depicting an exemplary output of the system at 1 month into the 6 month contract.

FIG. 12 is a table depicting an exemplary output of the system at 3 months into the 6 month contract.

FIG. 13 is a table depicting an exemplary output of the system at the end of the 6 month contract, i.e. 6 months into the contract.

Similar reference numerals may have been used in different figures to denote similar components

DETAILED DESCRIPTION

Example embodiments relate to systems and methods for predicting and managing time-variant supplier variables for supplier procurement. Example embodiments of the system and methods include the following: i) Evaluation of supplier specific information, global marketplace information and contract specific information to monitor time-variant variables of the procurement contract, such as supplier risk; and ii) Comparing and analyzing the time-variant supplier variables over time to provide a user with a real time assessment of the performance of the contract.

Figure 1:
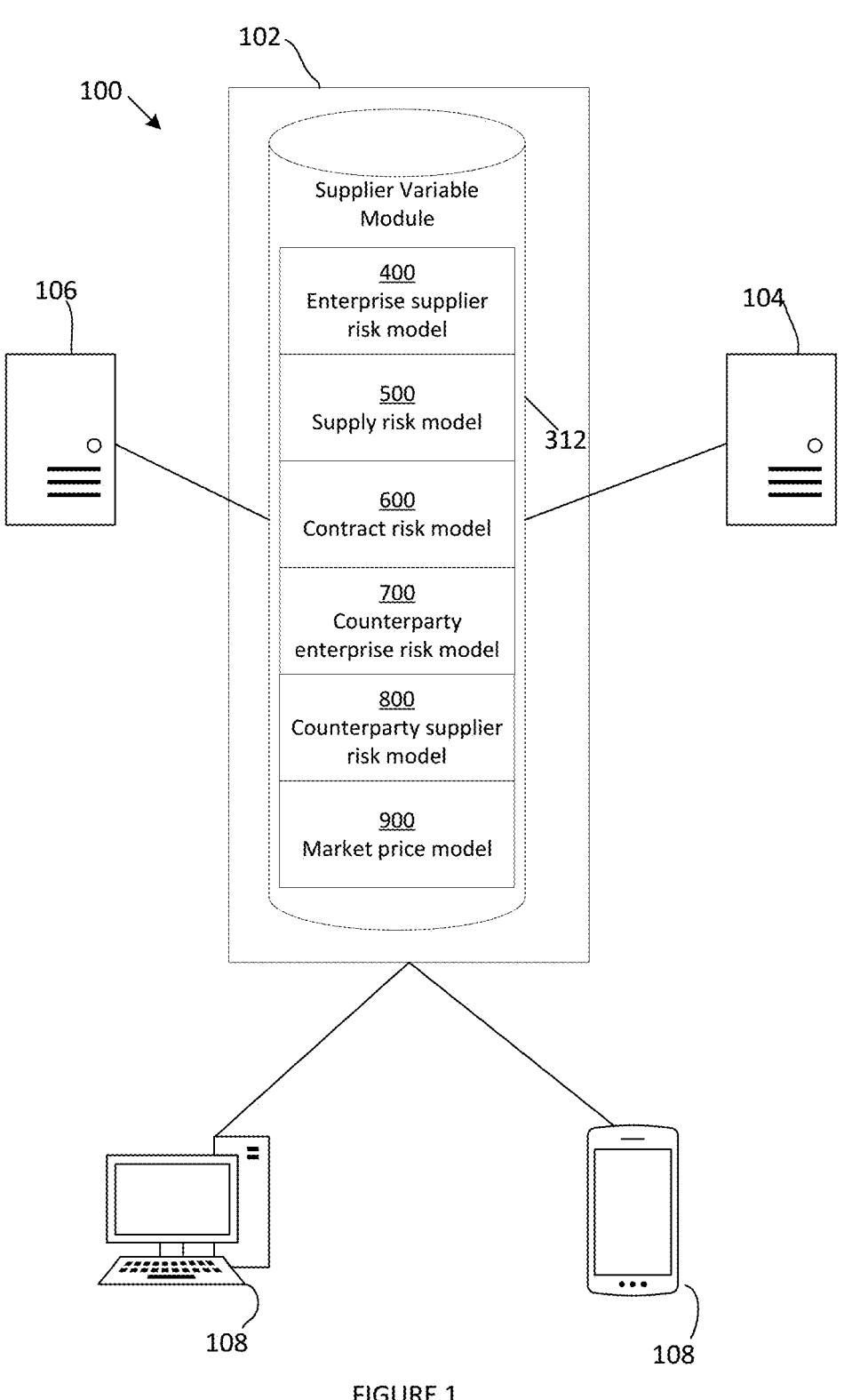
FIG. 1 is a schematic diagram of a system for predicting and managing time-variant supplier variables for supplier procurement.

FIG. 1 illustrates a system 100 for managing and predicting time-variant supplier variables according to an example embodiment. The system 100 can be used to manage supplier procurement contracts, and a marketplace of approved suppliers and can monitor certain variables related to such contracts or the marketplace of approved suppliers. The variables may vary over time and thus it is important to monitor the variables to ensure that contract can be performed in the most efficient, cost-effective, low-risk manner and can produce the optimal results. The system 100 can include a server 102, a local database 104, a remote database 106 (which includes at least one memory), and one or more electronic devices 108.

The server 102 can include a marketplace of approved suppliers. Suppliers can be monitored generally, as they perform in the general marketplace, or in relation to a particular contract. The server 102 will receive various information from the local database 104 and the remote database 106, allowing the server 102 to predict the supplier's performance in the absence of a specific contract being monitored. In some examples, the server 102 can have threshold values for the time-variant supplier variables. Accordingly, when the time-variant supplier variable passes the threshold value, the supplier will be included in the marketplace of approved suppliers. For example, when the system 100 detects that the counterparty supplier risk, described in further detail in relation to FIG. 8, has reached the threshold value (i.e. that the counterparty supplier risk is sufficiently low), the server 102 can include the supplier in the marketplace of approved suppliers.

The server 102 includes a processor. The server 102 can be configured to receive information from the local database 104 and the remote database 106. The information stored in the local database 104 and remote database 106 relate to the supplier, the specific contract terms and conditions, the state of the market, such as market prices, credit information, supplier assessments and outcomes, and any other information that may be relevant to the time-variant supplier variables. Importantly, the server 102 can be configured to receive the details and terms of the contract from which the time-variant supplier variables can be derived. The details and terms of the contract may be automatically compiled into the local database 104 or the remote database 106 at the time the parties enter into the contract. Alternatively, a user of the system 100 may manually input the details and terms of the contract into the server 102 through the electronic devices 108.

The local database 104 may include information that is generated and stored by the user of the system 100 and is not accessible to the general public. For example, a user of the system 100 may be a financial institution that is evaluating the risk associated with a contract for the supply of a certain good or service. There may be certain information related to the contract that is confidential and thus should be accessed only by the financial institution to ensure confidentiality is maintained while also providing the relevant information to the server 102. Thus, such confidential information can be stored on the local database 104.

The remote database 106 may include information that is publicly available or information that is generated by a third party, separate from the user of the system 100. The information may be generated and sent directly to the remote database 106 or it may be retrieved from the Internet. Information that may be stored in the remote database 106 may include financial information about the supplier, interest or inflation rates, credit scores, market prices for certain goods or services, availability of a particular good or service, location information (i.e. a certain goods may not be widely available in certain countries), trends in the marketplace, corporate structure of a supplier, supplier quality information or any other information that is relevant to the determination of the time-variant supplier variables.

The server 102 can receive the information stored in the local database 104 and the remote database 106, and compile them into the relevant data sets, including the user historical data set 302, the global historical data set 304 and the external data set 306. The various data sets are described in further detail in FIG. 3.

In some examples, the server 102 can be a cloud server. The system 100 illustrated in this example is a cloud platform, which allows both the data stored in the local database 104, the remote database 106 and the outputs of the server 102 to be accessed and stored in various locations globally.

The processor of the server 102 includes the supplier variable module 312 which is configured to receive the information from the user historical data set 302, the global historical data set 304 and the external data set 306. The information received by the supplier variable module 312 may include any information that can be used to generate the sets of outcomes pursuant to the method 200, described in FIG. 2. The supplier variable module 312 can comprise a supplier variable model (which includes a machine learning model). Upon receiving the information from the data sets, the supplier variable module 312 can be configured to generate a set of outcomes, which can include at least one time-variant supplier variable. In an example, the generating of the set of outcomes includes predicting the set of outcomes, and includes predicting the at least one time-variant supplier variable.

The supplier variable module 312 can include one or more models for generating the time-variant supplier variable. For example, as shown in FIG. 1, the supplier variable module 312 can include an enterprise supplier risk model 400, a supply risk model 500, a contract risk model 600, a counterparty enterprise risk model 700, a counterparty supplier model 800, and a market price model 900. The various models are described in more detail in relation to FIGS. 4, 5, 6, 7, 8, and 9.

In some embodiments, the supplier variable module 312 can use artificial intelligence to improve the accuracy, quality and effectiveness of the outputs of the system 100. For example, the system 100 may be used to evaluate supplier risk. Supplier risk can be challenging to quantify as compared to other types of risk, such as foreign exchange risk, and can often rely on qualitative assessments performed by individuals. By implementing artificial intelligence, the supplier variable module 312 can improve the supplier risk determinations, and can determine the supplier risk in a more efficient and stream-lined process. As the system 100 monitors more suppliers, whether during the performance of a contract or otherwise, the supplier variable module 312 can improve the manner in which the models in the supplier variable module 312 generate their outputs.

In some examples, the supplier variable module 312 includes a supplier variable model which can include a neural network running on a computing platform such as the server 102. Neural networks will be briefly described in general terms. A neural network can include multiple layers of neurons, each neuron receiving inputs from a previous layer, applying a set of weights to the inputs, and combining these weighted inputs to generate an output, which can in turn be provided as input to one or more neurons of a subsequent layer. The neural network is formed by joining a plurality of the foregoing single neurons. In other words, an output from one neuron may be an input to another neuron. An input of each neuron may be associated with a local receiving area of a previous layer, to extract a feature of the local receiving area. The local receiving area may be an area consisting of several neurons.

In order to generate the sets of outcomes, including the time-variant supplier variables, the supplier variable model is trained and tested. In the example of a neural network, training a neural network involves learning or determining the appropriate weight values at different weight locations throughout the network. After being optimally trained to perform a given inference task, the weights of the neural network will not all contribute equally to the final inference outputs: some weights may have high value due to their high contribution, while other weights may have low value due to their low contribution. If the weights are not properly trained (e.g., high value weights are misplaced or miscalibrated by training), then the trained network may perform with less accuracy. In the system 100, the neural network can be trained using a suitable set of training data including data obtained from each of the user historical data set 302, the global historical data set 304, the external data set 306 as well as outputs from the supplier variable module 312. In the system 100, the neural network can be trained using actual data and results that is tracked during actual operation of the neural network.

In order to test the neural network, a suitable training data set 308 can be obtained from each of the user historical data set 302, the global historical data set 304, the external data set 306, as well as outputs from the supplier variable module 312. The testing data set 310 may generally include a subset of the training data set 308 and may be specifically selected by the user of the system 100 to simulate real world conditions. For example, if an industry is doing poorly financially, a financial institution may be interested in seeing how the financial state of the industry may affect its supplier contracts in that industry. In such a situation, the user can define a set of information to be included in the testing data set 310 that would simulate such financial conditions and observe how the time-variant supplier variables are impacted by such conditions. The user can select the testing data set 310 from the electronic devices 108.

The server 102 is configured to output the set of outcomes to the electronic devices 108. The electronic devices 108 can be a desktop, a laptop, or a mobile communication device, such as a smart phone or tablet. With the electronic devices 108, the system 100 is suitable for use by the parties to the supplier contract, or other users who will be monitoring the contract performance, such as consulting firms or financial institutions.

The server 102 may generate a user interface, such as a web-portal or a dashboard for the electronic devices 108 to connect to and supplier variable module 312. By connecting the server 102 to the user interface, the user can access the relevant information from the local database 104 and the remote database 106 in order to obtain information about the supplier and the marketplace. The server 102 may include at least one memory for storing data from the electronic devices 108, the supplier variable module 312, local database 104 and the remote database 106. The server 102 may also store software updates to the system 100 and notify the electronic devices 108, for example by using a flag to indicate that a software update is available. An electronic device 108 may check the status of the software or the flag for software update in the server 102. The server 102 may also notify an electronic device 108 with the results from the system 100, for example, by emails or short messages. The electronic devices 108 may download the software from the server 102 to the system 100 via a suitable communication modality over the Internet.

The processor of the server 102 executes a marketplace application, also referred to as global marketplace. The local database 104 or the remote database 106 accessible by the server 102 includes the approved suppliers whom are listed in the marketplace application. In some examples, the local database 104 or the remote database 106 of the server 102 also includes the approved purchasers whom are listed in the marketplace application. The user interface provided by the server 102 can include access to the marketplace application. The marketplace application may allow users of the server 102 to connect with other entities, make offers and acceptances on contracts, formalize contracts, tender bids for contracts, and manage the performance of the supplier throughout the lifecycle of a contract. By providing the user interface with these controls, a user can evaluate suppliers prior to entering into a contract with the suppliers, initiate and formalize supplier contracts, monitor performance under the contract, automatically update the contract terms, and flag any concerns related to a particular supplier or contract performance. By using these features of the user interface, a user can provide new inputs and monitor new outputs of the server 102 in order to accurately manage and predict the time-variant supplier variables. Before, during, and after entering a supplier contract through the marketplace application, the server 102 can generate and output the time-variant supplier variables to the enterprise and to the supplier for the particular supplier procurement or supplier contract.

In some examples, the server 102 can include multiple marketplaces of approved suppliers in the global marketplace. When there is several marketplaces of approved sellers, the server 102 may include a multi-tenanted marketplace environment. The multi-tenanted marketplace environment can allow any number of enterprises to use the system 100 and monitor its own separate sub-marketplace. These sub-marketplaces may include the approved sellers who are entitled to work for the particular enterprise, for example via a Master Service Agreement. When there is a multi-tenanted marketplace environment, users of the system 100 can invite suppliers to join the multi-tenanted marketplace environment at their own discretion to be added to one or more of the enterprises' approved supplier lists, resulting in full control and customization of each enterprise's individual sub-marketplace. Accordingly, each enterprise can use the system 100 to monitor its own marketplace of approved suppliers. While time-variant supplier variables may be monitored within each of the sub-marketplaces in which a supplier has been approved, the system 100 may also receive all information resulting from the supplier's performance within the sub-marketplaces to add to the local database 104 or the remote database 106. By receiving this information from the sub-marketplaces, the system 100 can monitor the time-variant supplier variables over time and across the various enterprises. For example, the system 100 can monitor a suppliers overall risk score in the global marketplace and can use the overall risk score to predict suppliers who may be likely to fail to deliver goods or services, or supplier risk breaches.

The electronic devices 108 can also be used to send inputs to the server 102. For example, market fluctuations may result in participants in certain industries being less financially stable. In such a situation, a user, such as a financial institution may need to re-evaluate the time-variant supplier variables, such as the ability of a party to deliver the goods and services under that contract or the risk associated with the a particular supplier or contract, in view of the change of circumstances. A user can then use the electronic devices 108 to instruct the server 102 to perform the method 200, described in FIG. 2, to evaluate the desired time-variant supplier variables. The server 102 may also be configured to receive updated information from the remote database 106 automatically, such as when there is a change in market conditions. The server 102 can then also be configured to automatically perform the method 200 when it receives the updated information.

The server 102 may also be configured to store the outputs of the supplier variable module 312. It may be beneficial to monitor the time-variant supplier variables throughout the duration of the supplier contract or throughout the suppliers participating in the global marketplace. For example, the risk associated with a particular supplier may vary over time, as portions of the contract are performed. In such a case, the supplier variable module 312 can be configured to receive information throughout the duration of the contract, from the various data sets, and generate the time-variant supplier variable at various times throughout the contract duration. In other examples, the supplier variable module 312 may be configured to monitor the time-variant supplier variables in relation to a particular supplier overtime, in order to determine whether the particular supplier will be able to perform contracts in the future. By monitoring the suppliers generally (i.e. not in relation to a particular contract), a user can determine whether to engage that supplier for a supplier contract in the future.

The server 102 can store the outputs of the supplier variable module 312, such as the supplier risk, and compare the outputs over the duration of the contract. By comparing the outputs throughout the duration of the contract, a user of the system 100 can monitor the time-variant supplier variables throughout the performance of the contract and can identify when any of the time-variant supplier variables reach or surpass a certain respective threshold value. Similarly, when monitoring a supplier outside of the performance of a contract, there may be a threshold value such that when the time-variant supplier variables surpass the threshold, the supplier should no longer be considered for certain procurement contracts. In an example, these threshold values may be predetermined threshold values that are consistently applied by the supplier variable module 312 to all contracts. In an alternative example, the threshold values may be specific to the contract, or to the industry in which the supplier works. In another example, a user can input the threshold values to the server 102 from the electronic devices 108 on a contract-by-contract basis. In another example, the threshold values are learned by the supplier variable model.

In some examples, the server 102 may be configured to continuously generate the time-variant supplier variable throughout the duration of the contract or over a certain period of time and notify a user of the system 100 of any substantial changes in the time-variant supplier variable. In other examples, the server 102 may be configured to store and track the time-variant supplier variable over time such that a user of the system 100 can observe the trend in the time-variant supplier variable by accessing a web-based application or dashboard from the electronic devices 108.

The frequency that the time-variant supplier variable is generated may also depend on the status of the contract. For example, a contract may have several phases, in which case there may be a need to assess the time-variant supplier variable at a higher frequency during a particular phase of the contract. Where such phases exist, whether explicitly provided in the contract, generated by the supplier variable module 312, or manually entered into the server 102 by a user of the system 100, the frequency of generating the time-variant supplier variable can be a predetermined frequency, applied to all contracts. In other examples, the frequency can be input by a user of the system 100 through the electronic devices 108. In another example, the frequency can be determined by the server 102 based on a variety of factors, such as the type of contract, industry, duration of the contract, a particular supplier being party to the contract or any other factors which may result in a need for more or less frequent generation of the time-variant supplier variable. For example, when the time-variant supplier variable relates to supplier risk, there may be a higher level of risk at the outset of the contract when no payments have been made, compared to the final phase of the contract, when a more substantial portion of the contract price has been paid.

Figure 2:
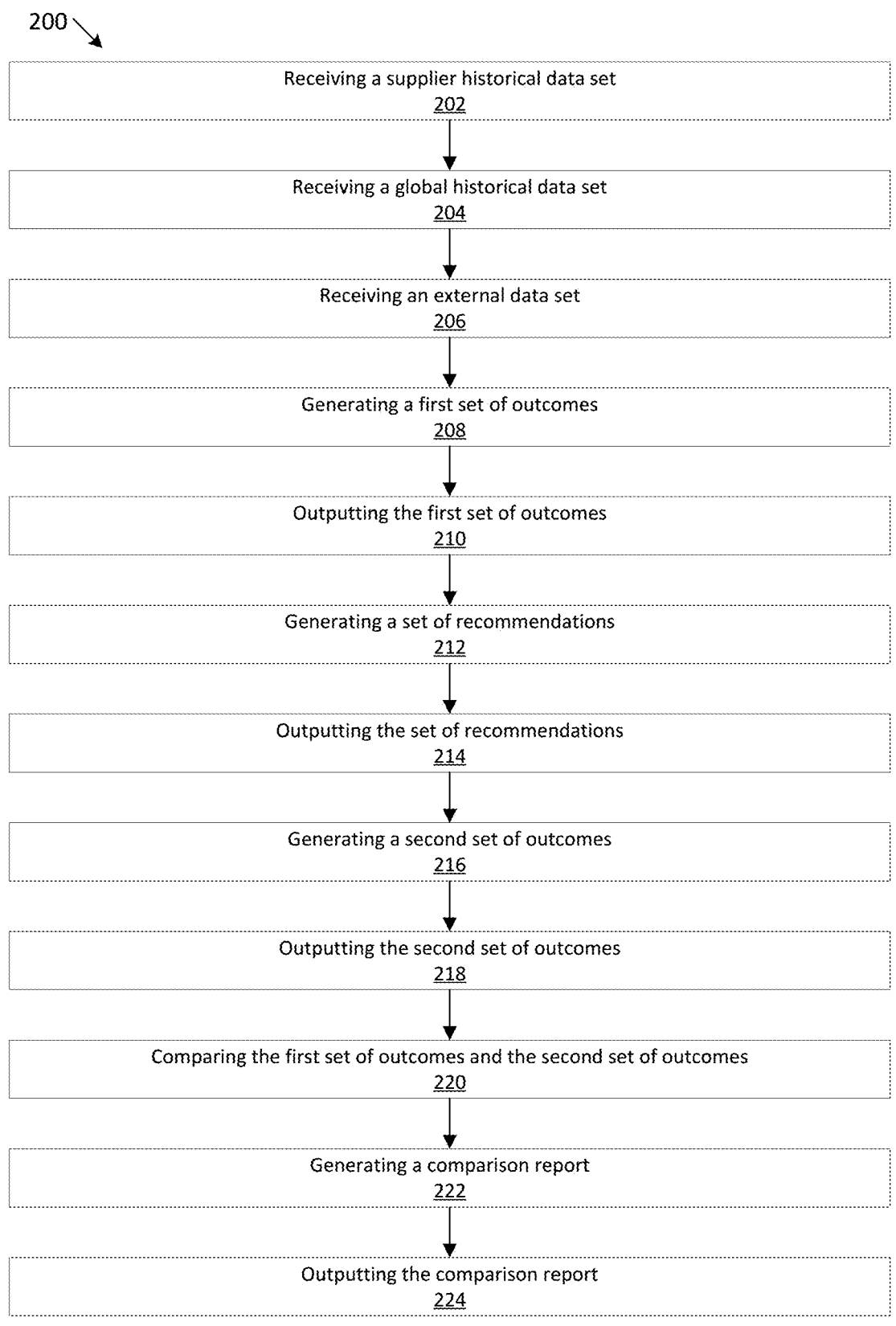
FIG. 2 is a flow chart illustrating a method for using a supplier variable module to predict and manage time-variant supplier variables for supplier procurement.

FIG. 2 is a flow chart illustrating a method 200 for managing and predicting time-variant supplier variables, such as enterprise supplier risk 324. In method 200, at step 202, the server 102 receives a user historical data set 302. The user historical data set 302 may include information that is stored in the local database 104 or the remote database 106. The information contained within the user historical data set 302 may include information related to the individual entity being evaluated. For example, the server 102 may receive credit scores for the entity being assessed from a third party, through the remote database 106, which is then stored within the user historical data set 302. In other examples, such as when the system 100 is being used by a financial institution monitoring the performance of a supplier contract, the user may be capable of independently producing information related to the entity being assessed. For example, the financial institution may have its own supplier risk assessment capabilities, in which case the assessment information of the entity being assessed may be received from the local database 104. Generally, all relevant historical information related to the entity being assessed by the system 100 can be included in the user historical data set 302 and may be retrieved from either the local database 104 or the remote database 106. In some examples, the entity being assessed by the user of the system 100 may be either the supplier or the purchaser of a contract. In other examples, the entity being assessed may be a third party to the contract, such as a subcontractor of the supplier. In general, the entity being assessed may be the entity that the time-variant supplier variable is attributable. For example, when the time-variant supplier variable is a supplier risk, the entity being assessed is the supplier.

At step 204, the server 102 receives a global historical data set 304. The global historical data set 304 may include information that is stored in the local database 104 or the remote database 106. The information contained within the global historical data set 304 may include information related to the global marketplace and global market behaviors. Other information may be included in the global historical data set 304 such as current market trends and forward-looking market trends. In some examples, the user is a financial institution, capable of analyzing global marketplace trends and behaviors itself. In this situation, the information stored in the global historical data set 304 may be received from the local database 104. In other examples, the user may not have the capability of producing such global marketplace information, so the information contained in the global historical data set 304 is received from external sources through the remote database 106. Generally, all relevant historical information related to the global marketplace related to the supplier contract can be included in the global historical data set 304 and may be retrieved from either the local database 104 or the remote database 106. As an entity, such as a supplier, is assessed over time and in relation to contract performance with various different enterprises, the information obtained through these assessments can also be included in the global historical data set 304.

At step 206, the server 102 is configured to receive an external data set 306. The external data set 306 includes information that is not readily or locally available to the user of the system 100. As such, the external data set 306 can primarily contain information from the remote database 106. The external data set 306 includes information that is required to generate the time-variant supplier variables, such as credit risks, supplier and vendor performance scores, news releases, or external risk assessments. In some examples, such as when the user of the system 100 is capable of generating supplier performance scores or credit risks, the external data set 306 may receive the information from the local database 104. In some examples, all relevant, external information related to the supplier contract can be included in the external data set 306 and may be retrieved from either the local database 104 or the remote database 106.

The information to be included in the user historical data set 302, the global historical data set 304 and the external data set 306 can include any information stored in the local database 104 and the remote database 106, and that can assist in the generation of the time-variant supplier variable. The server 102 can be configured to display the information stored in the user historical data set 302, the global historical data set 304 and the external data set 306, for example through a web-application or dashboard on the electronic devices 108. The server 102 may output a notification to the electronic devices 108, after compiling the various data sets, so that the user can verify the information and update any information that is inaccurate. In other examples, the server 102 can be configured to send a notification to the electronic devices 108 to indicate missing information from the various datasets, allowing a user to fill in the missing information.

At step 208, the server 102 is configured to generate a first set of outcomes. The first set of outcomes can include at least one time-variant supplier variable and can be related to a first point in time. The first set of outcomes may include any number of outcomes that relate to the supplier or the contract performance, such as market prices of the goods or services provided under the contract, new risks identified in relation to the contract or supplier, contract irregularities, supplier risk or behavioral trends. Examples of time-variant supplier variables, and the supplier variable models used to generate the time-variant supplier variables through inference, will be described in further detail in FIGS. 3, 4, 5, 6, 7, 8, and 9. The server 102, is further configured to output the first set of outcomes to the electronic devices 108, at step 210. Step 210 can include: outputting the first set of outcomes to a display, generating data of the first set of outcomes for display, sending the first set of outcomes to a memory, or transmitting the first set of outcomes to one of the electronic devices 108.

In some examples, at step 212, the server 102 is further configured to generate a set of recommendations. The set of recommendations may be determined based on the first set of outcomes. The set of recommendations may also be determined based on a changed in the outputs of the server 102. For example, the server 102 may be configured to generate the first set of outcomes at various intervals throughout the duration of the contract, such as every week, or every month. In such a case, the server 102 may be further configured to compare the sets of outcomes and determine whether certain actions need to be taken in order to minimize financial or other risks in fulfilling the contract. For example, the set of recommendations may include ways to minimize or mitigate risks; information that is needed in order to reassess the set of outcomes; suggested amendments to the contract; increased demand for the skill set of the supplier or vendor; behaviors of the parties that predict failure in performing the contract; indications that a new mitigation strategy would improve the risk profile of the contract; persons related to a party to the contract consistently demonstrating a bias in the contract performance; or sustained or consistent underperformance of contracts. The set of recommendations can include any number of recommendations that may improve contract performance and minimize the risk associated with the supplier or the contract performance. Having generated the set of recommendations, the server 102 is further configured to output the set of recommendations to the electronic devices 108 at step 214.

In some examples, the server 102 may be configured to generate a second set of outcomes at step 216. The second set of outcomes can be related to a second point in time, occurring after the first point in time when the first set of outcomes was generated. The second point in time may be a predetermined time. For example, a user of the system 100 may indicate that certain outcomes, such as supplier risk, should be generated every month during the duration of the contract, in which case the second point in time can be one month after the first point in time. In other examples, the server 102 is configured to generate the second set of outcomes automatically upon receiving certain information from the local database 104 and the remote database 106. For example, the server 102 may receive an indication that a certain industry related to the contract is struggling financially in the global market, and the server 102 may be configured to generate a second set of outcomes in response to this indication. In other examples, the server 102 may receive an indication that a supplier is performing poorly or may go bankrupt, in which case the server 102 can be configured to generate a second set of outcomes in response to the status of the supplier. The second set of outcomes may include similar, updated information as the first set of outcomes. By generating the second set of outcomes, the time-variant supplier variables can be monitored over time, or throughout the performance of the contract, and any changes in the time-variant supplier variable can be noted. The server 102 is also configured to output the second set of outcomes at step 218. Step 218 can include: outputting the second set of outcomes to a display, generating data of the second set of outcomes for display, sending the second set of outcomes to a memory, or transmitting the second set of outcomes to one of the electronic devices 108.

Having generated a first and a second set of outcomes, the server 102 may be further configured to compare the first and second set of outcomes at step 220. The server 102 is configured to then generate a comparison report related to the first and second set of outcomes at step 222. The comparison report can comprise a number of conclusions about the first and second set of outcomes. For example, the comparison report may summarize any changes in the sets of outcomes, including in the time-variant supplier variable.

The comparison report can also include recommendations, similar to those recommendations generated in step 212 in relation to the change in the set of outcomes. The comparison report can also include new outcomes that may not have existed in the first set of outcomes, but have occurred since the first set of outcomes were generated. For example, a purchaser may have defaulted on a payment to a supplier after the first set of outcomes are generated, and the server 102 can evaluate that defaulted payment to determine the new risks, if any, associated with the purchaser. After generating the comparison report, the server 102 is configured to output the comparison report to the electronic devices 108 at step 224. Step 224 can include: outputting to a display, generating data for display, sending data to a memory, or transmitting data to one of the electronic devices 108.

FIGS. 3, 4, 5, 6, 7, 8, and 9 illustrate exemplary embodiments of the processes used by the supplier variable module 312 in generating the first and second sets of outcomes, as set out in method 200. In the example embodiments of FIGS. 3, 4, 5, 6, 7, 8, and 9, the set of outcomes 301 to be generated by the server 102 are related to risks associated with the procurement of goods or services by a financial institution. The embodiments of FIGS. 3, 4, 5, 6, 7, 8, and 9 are exemplary and intended to illustrate the process of generating the sets of outcomes. Other sets of outcomes including different time-variant supplier variables may also be generated by the server 102. While the models of FIGS. 3, 4, 5, 6, 7, 8, and 9 are generally described in relation to the performance of a supplier under a contract, the models can also be used to determine the time-variant supplier variables in the absence of a contract in order to monitor the supplier risk of a particular supplier over time and determine whether the particular supplier should be engaged in supplier contracts in the future.

Figure 3:
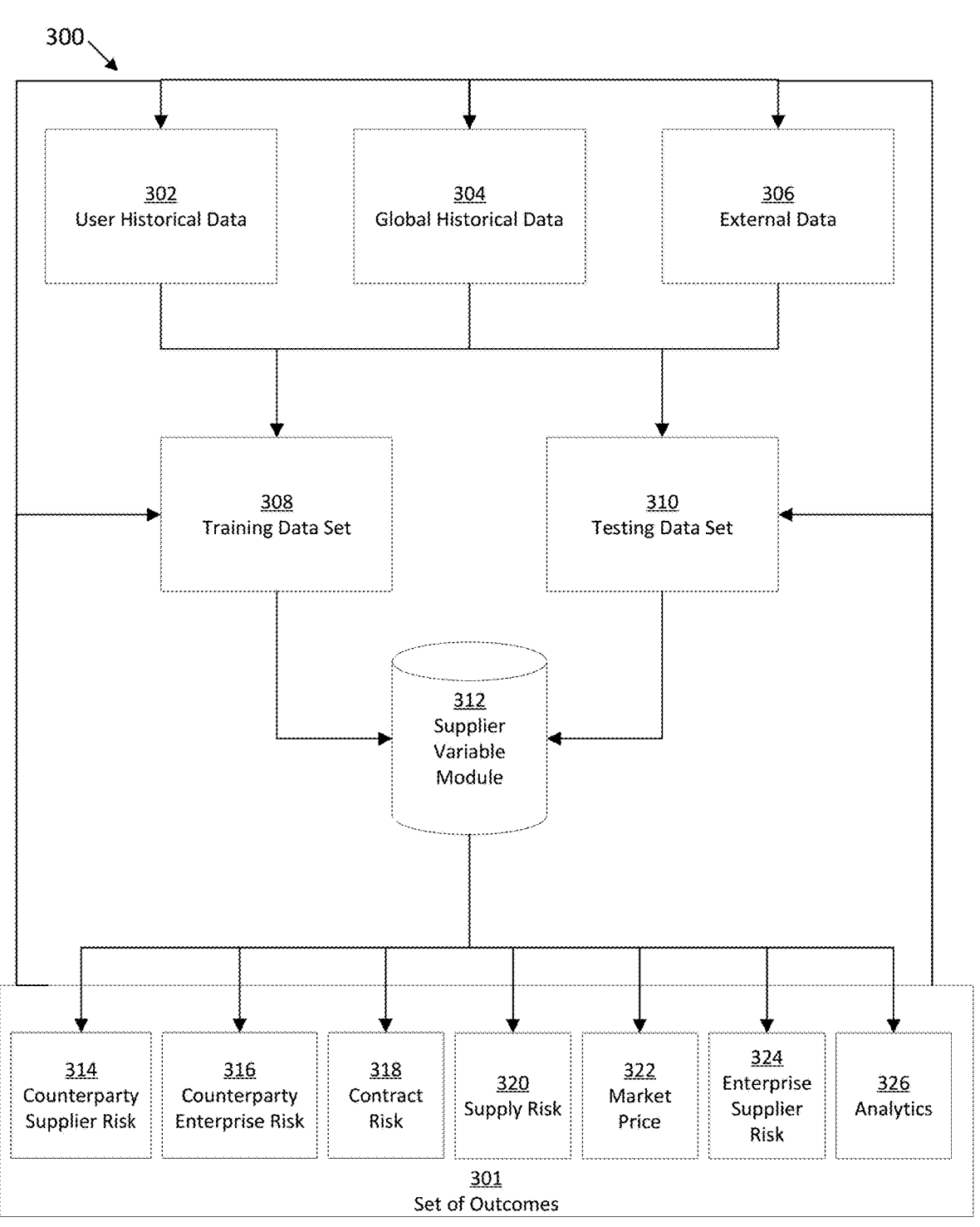
FIG. 3 is a schematic diagram of an exemplary system wherein the time-variant supplier variable is supplier risk.

FIG. 3 illustrates a flow chart of an example embodiment of the process 300 performed by the supplier variable module 312 for generating the set of outcomes 301. In the example embodiment of FIG. 3, the supplier variable module 312 can be a supplier variable model that comprises any combination of an enterprise supplier risk model 400 (FIG. 4), a supply risk model 500 (FIG. 5), a contract risk model 600 (FIG. 6), a counterparty enterprise risk model 700 (FIG. 7), a counterparty supplier risk model 800 (FIG. 8), and a market price model 900 (FIG. 9).

In the example embodiment of FIG. 3, the supplier variable module 312 receives the information stored in the user historical data set 302, the global supplier dataset 204 and the external data set 306. In addition to providing the information to the supplier variable module 312, the server 102 is configured to compile portions of the information contained in the user historical data set 302, the global supplier data set 304 and the external data set 306 into a training data set 308 and a testing data set 310. The training data set 308 and the testing data set 310 can include the same information or can include different information. The training data set 308 may be used by the server 102 to train the supplier variable module 312 and improve the accuracy and quality of the set of outcomes 301. The testing data set 310 may be used by the server 102 to test the supplier variable module 312 and ensure that the supplier variable module 312 is generating and outputting an accurate set of outcomes 301.

In the example embodiment, the set of outcomes 301 include a counterparty supplier risk 314, a counterparty enterprise risk 316, a contract risk 318, a supply risk 320, a market price 322, an enterprise supplier risk 324, and a set of analytics 326. The counterparty enterprise risk 316 may be generated by the counterparty enterprise model 700. The counterparty supplier risk 314 may be generated by the counterparty supplier risk model 800. The contract risk 318 may be generated by the contract risk model 600. The supply risk 320 may be generated by the supply risk model 500. The market price 322 may be generated by the market price model 900. The enterprise supplier risk 324 may be generated by the enterprise supplier risk model 400. Finally, the set of analytics 326 may be generated by the supplier variable module 312 and can generally include information related to the accuracy, quality and efficacy of the set of outcomes 301. For example the set of analytics 326 may indicate information that is missing or that would be useful in order to obtain a more accurate set of outcomes 301. In other examples, the set of analytics 326 may indicate conflicting information or may flag certain errors in the information provided to the supplier variable module 312 or errors in the set of outcomes 301.

The supplier variable module 312 may be configured to continuously monitor the inputs and outputs of the various models illustrated in FIG. 4, 5, 6, 7, 8, or 9. The supplier variable module 312 may also be configured to continuously output the set of outcomes 301, such that a user of the system 100 has the ability to review the set of outcomes 301 in real time. The supplier variable module 312 can alternatively be configured to only output the set of outcomes 301 as certain intervals, such as every week, every month, every year or any other intervals that allow the user to accurately monitor the time-variant supplier variables. In other examples, a user can request that the supplier variable module 312 generate the set of outcomes 301 by sending a request from the electronic devices 108 to the server 102.

In addition to the information from the user historical data set 302, the global historical data set 304 and the external data set 306, the supplier variable module 312 can also receive the set of outcomes 301 as an input. By receiving the set of outcomes 301 as an input, the supplier variable module 312 can evaluate the set of outcomes 301 for accuracy and re-generate the set of outcomes 301 as necessary to improve the accuracy of the set of outcomes 301.

Figures 4, 5:
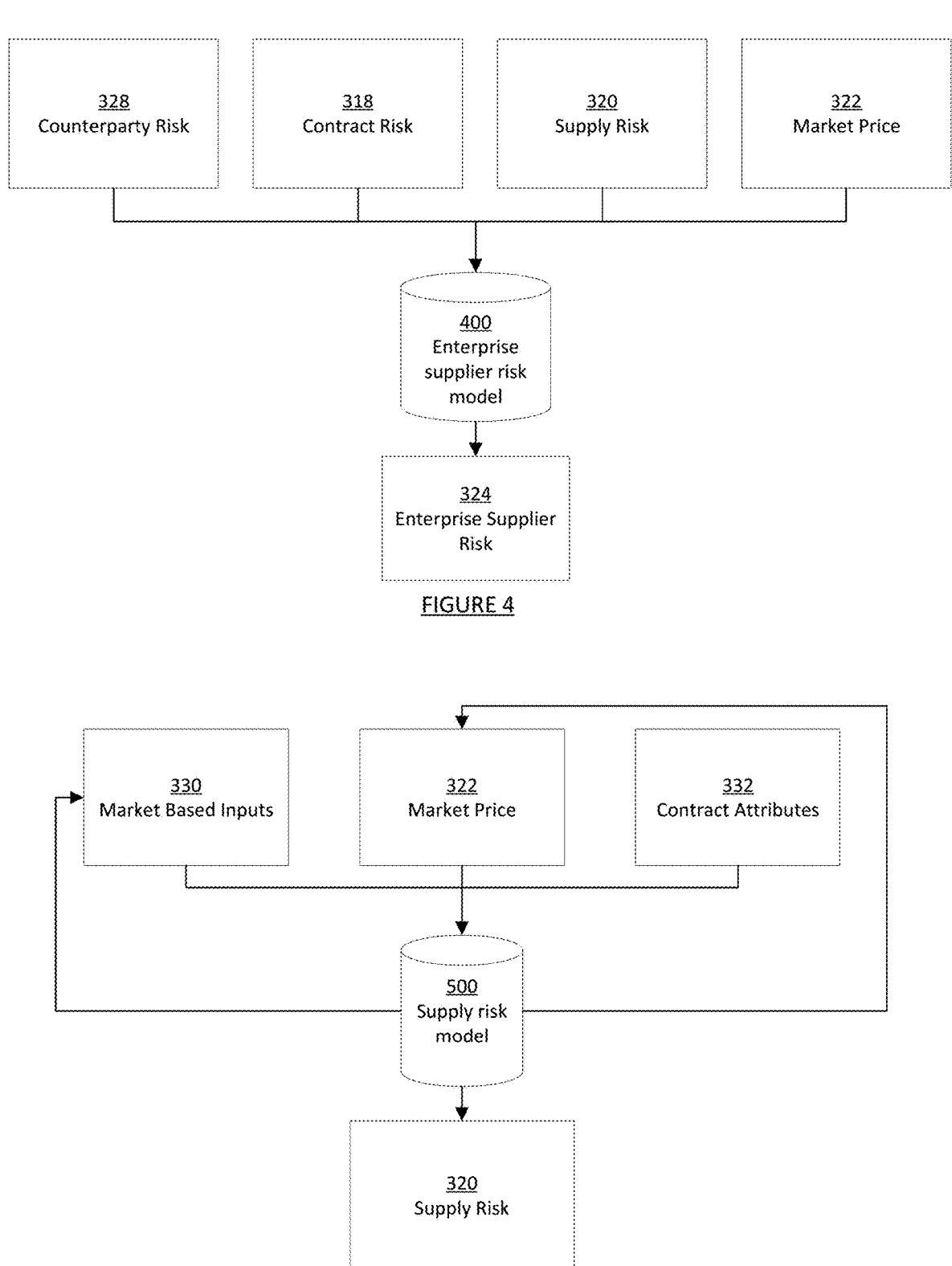
FIG. 4 is a schematic diagram of an exemplary enterprise supplier risk model used by the supplier variable module.
FIG. 5 is a schematic diagram of an exemplary supply risk model used by the supplier variable module.

FIG. 4 illustrates an example embodiment of the enterprise supplier risk model 400 that can be used by the supplier variable module 312 to generate the enterprise supplier risk 324. Enterprise supplier risk 324 generally provides an accumulated risk associated with certain parameters, including the counterparty risk 328, the contract risk 318, the supply risk 320 and the market price 322, which will be described in greater detail with respect to FIGS. 5, 6, 7, 8, and 9. Enterprise supplier risk 324 is a measure of risk that can be expressed in a variety of manners. For example, enterprise supplier risk 324 may be depicted as risk appetite, budgets, capital or reserves and can be expressed as distributions over time, space or across organizations. The server 102 can be configured to include the enterprise supplier risk 324 in the set of outcomes 301 that are generated by the supplier variable module 312 and output to the electrical devices 108.

In some examples the enterprise supplier risk 324 can be expressed as a value at risk (VaR). VaR is a statistic that measures and quantifies the level of financial risk within a supplier, purchaser, industry, portfolio or position over a certain period of time. This metric is most commonly used by investment and commercial banks to determine the extent and occurrence ratio of potential losses in their institutional portfolios. Risk managers use VaR to measure and control the level of risk exposure. One can apply VaR calculations to specific positions or whole portfolios or to measure supplier-wide or purchaser-wide risk exposure.

In other examples, the enterprise supplier risk 324 can be expressed as a conditional value at risk (CVaR). CVaR, also known as expected shortfall, is a risk assessment measure that quantifies the amount of tail risk supplier, purchaser or contract has. CVaR is derived by taking a weighted average of the "extreme" losses in the tail of the distribution of possible returns, beyond the value at risk (VaR) cut-off point. Conditional value at risk is used in supplier procurement optimization for effective risk management.

In addition to generating the enterprise supplier risk 324 as one of the set of outcomes 301, the enterprise supplier risk model 400 can also generate a set of recommendations related to the generated enterprise suppler risk 324. For example, the enterprise supplier risk model 400 can provide high-level governance warnings, recommended mitigation strategies, suggestions, warnings or flags.

Depending on the desired format of the output, the supplier variable module 312 can determine how to generate the enterprise supplier risk 324. For example, certain time-variant supplier variables related to a contract may be more readily understood in terms of CVaR. The supplier variable module 312 can be configured to determine the most appropriate output format for the enterprise supplier risk 324. Alternatively, the supplier variable module 312 can be configured to receive an input from a user indicating the desired format of the output.

FIG. 5 illustrates an example embodiment of the supply risk model 500 that can be used by the supplier variable module 312 to generate the supply risk 320. Supply risk 320 can be used to determine other time-variant supplier variables, such as the enterprise supplier risk 324, as described in FIG. 4.

The supply risk model 500 can receive inputs of market based inputs 330, market price 322 and contract attributes 332. The market based inputs 330 can include any information about the market that is relevant to generating the supply risk 320, such as supply, demand, market stability, location-based market information or any other relevant market information. The market based inputs 330 may comprise information received from the user historical data set 302, the global historical data set 304 or the external data set 306. Alternatively, the supplier variable module 312 may be configured to generate the market based inputs 330 based on information received from the various data sets. The supply risk model 500 can be configured to receive the market based inputs 330 from the various data sets and can be further configured to repeatedly generate the time-variant supplier variables in order to generate more accurate, detailed and relevant market based inputs 330.

The market price 322 can be received from the user historical data set 302, the global historical data set 304 or the external data set 306. Alternatively, the market price 322 may be generated by the market price model 900, which will be described in greater detail in relation to FIG. 9.

The contract attributes 332 can be derived from the supplier contract. While the contract attributes 332 generally remain unchanged throughout the duration of the contract, there may be situations where terms are added to a contract, or existing contract terms are amended or removed. The server 102 may be configured to receive the altered contract terms, for example from a user input in the electrical devices 108. In other examples, the set of recommendations generated by the supplier variable module 312 may include recommended modifications to the contract, in which case the server 102 can be configured to automatically update the contract terms. Upon receiving the updated contract terms, whether from user input or from the supplier variable module 312, the server 102 can be configured to update the contract attributes 332 to reflect the amendments to the contract terms.

The supply risk model 500 can be configured to measure different key factors included in the inputs such as price, skillset of the supplier, availability of the supplier, and past performance of the supplier. Generally, the supply risk 320 can be expressed as a price by tenor. Tenor refers to the length of time remaining before a financial contract expires.

The supplier variable module 312 can be configured to continuously monitor the market based inputs 330, market price 322 and contract attributes 332 such that the supply risk 320 can be monitored in real time. Alternatively, the supplier variable module 312 may be configured to generate the supply risk 320 at predetermined intervals, such as every week or every month. The supplier variable module 312 may be configured to notify a user of the system 100, such as by sending a passed threshold notification to the electronic devices 108, when the supply risk 320 has reached (or passes) a threshold value. This threshold value can be provided by a user of the system 100 or can be determined by the supplier variable module 312.

The supply risk model 500 can also be configured to generate recommendations based on the generated supply risk 320. For example, the supply risk model 500 can identify risk flags, warnings related to particular actions in the performance of the contract, or risk mitigation strategies. Such recommendations can be included in the set of recommendations generated by the method 200.

Figure 6:
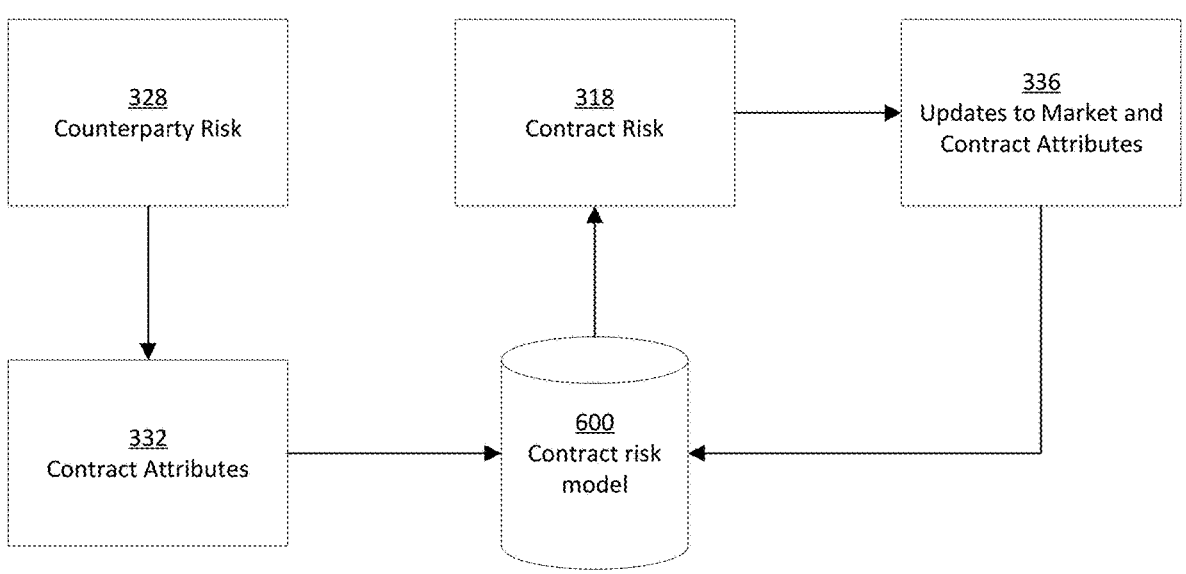
FIG. 6 is a schematic diagram of an exemplary contract risk model used by the supplier variable module.

FIG. 6 illustrates an example embodiment of the contract risk model 600 that can be used by the supplier variable module 312 to generate the contract risk 318. Contract risk 318 can be used to determine other time-variant supplier variables, such as the enterprise supplier risk 324, as described in FIG. 4. Contract risk 318 represents the promise of a contract compared to how the contract is actually delivered. In order to determine contract risk 318, there may be a standard set of criteria, outlined in each contract, which can be included in the contract attributes 332. In another example, the supplier variable module 312 may be configured to determine the standard set of criteria for the contract. In some examples, the standard set of criteria may be consistent across industries, or consistent for all contracts of a certain duration such that the supplier variable module 312 can be configured to select an appropriate pre-determined set of standard criteria for the particular contract. The contract attributes 332 can also include other relevant details of the contract, such as the relevant prices. The contract attributes 332 can also include supplier risk assessment monitoring priorities, for example when a particular supplier is known to have failed to meet contract terms in the past. The contract attributes 332 can also include updates to the contract, such as status updates (e.g. entering into a second phase of the contract), time-based updates (e.g. the timeline for the contract is extended), contract-based updates (e.g. terms of the contract that have been changed), or scope-based updates (e.g. the scope of the contract is expanded). The contract attributes 332 can include any additional information related to the contract that is relevant to generating the contract risk 318.

The contract attributes 332, as well as the counterparty risk 328 comprise the inputs for the contract risk model 600. Counterparty risk 328 can include both the counterparty enterprise risk 316 and the counterparty supplier risk 314, which will be discussed in greater detail in relation to FIGS. 7 and 8.

In some examples, the contract risk 318 is in the form of a Mark to Market (MTM) value. MTM compares the fixed price of a contract to the market price 322 over the duration of the contract. In other words, MTM is a method of measuring the fair value of accounts that can fluctuate over time, such as assets and liabilities. MTM is intended to provide a realistic appraisal of an institution's or company's current financial situation based on current market conditions. In other examples, contract risk 318 is in the form of other risk metrics, such as CVaR or VaR.

Since contract risk 318 depends on market conditions, the contract risk model 600 can be configured to continuously generate the contract risk 318 over time based on updates in the relevant market. In some examples, the supplier variable module 312 can receive updates to market and contract attributes 336 from the user historical data set 302, the global historical data set 304 and the external data set 306 from time to time. The supplier variable module 312 may be configured to continuously monitor until such updates to market and contract attributes 336 are received by the server 102 and to subsequently generate an updated contract risk 318, allowing a user to monitor the contract risk 318 over the duration of the contract. In other examples, the supplier variable module 312 can be configured to generate the contract risk 318 at pre-determined intervals, such as every week or every month. In yet another example, a user can send a request to the server 102 from an electronic device 108 indicating that the supplier variable module 312 should re-generate the contract risk 318. For example, a user may be aware of shifting market conditions that are not substantial yet, but are forecasted to be substantial in the future and as such there may be a need to re-evaluate the contract risk 318.

In order to more accurately generate the contract risk 318, the contract risk model 600 receives the previously generated contract risk 318 value and the updates to market and contract attributes 336, as well as the counterparty risk 328 and the contract attributes 332. The contract risk model 600 can be trained on the previously generated contract risk 318, such that the contract risk 318 can be more accurately generated in subsequent iterations.

The contract risk model 600 can also be configured to generate recommendations based on the generated contract risk 318. For example, the contract risk model 600 can identify risk flags, warnings related to particular actions in the performance of the contract, or risk mitigation strategies. Such recommendations can be included in the set of recommendations generated by the method 200.

Figure 7:
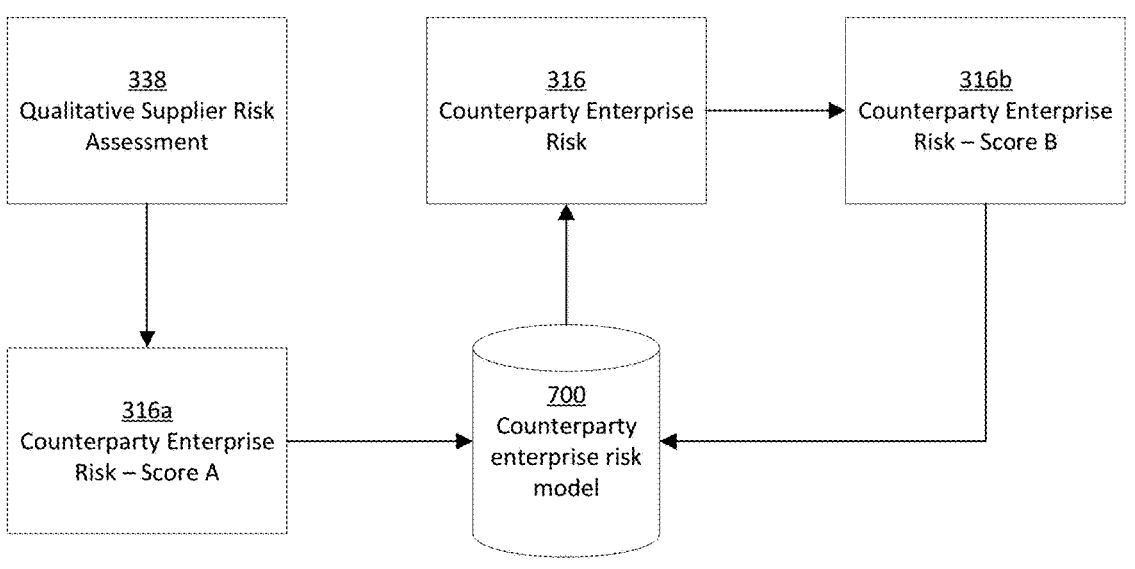
FIG. 7 is a schematic diagram of an exemplary counterparty enterprise risk model used by the supplier variable module.

FIG. 7 illustrates an example embodiment of the counterparty enterprise risk model 700 that can be used by the supplier variable module 312 to generate the counterparty enterprise risk 316. The server 102 is configured to receive a qualitative supplier risk assessment 338, which can be used by the supplier variable module 312 to generate an initial counterparty enterprise risk, score A 316a. Score A 316a can be an initial credit assessment based on external data in order to assess the financial stability of the enterprise that the supplier is entering into an agreement with. Score A 316a can also be generated based on information stored in the user historical data set 302, the global historical data set 304 and the external data set 306. Score A 316a can also be generated using information contained in the qualitative supplier risk assessment 338.

The qualitative supplier risk assessment 338 may be similar to traditional qualitative supplier risk assessments used in the industry. The qualitative supplier risk assessment 338 can include information such as payment history of the enterprise, corporate structure of the enterprise, corporate financial history of the enterprise or hiring manager data and assessments from the enterprise. The qualitative supplier risk assessment 338 will be described in further detail in FIG. 8.

The counterparty enterprise risk 316 can be in the format of a credit risk of the enterprise that the supplier is engaging. In some examples, the credit risk of an enterprise may be externally determined, in which case the supplier variable module 312 can receive the initial score A 316a from the external source, through the remote database 106. In other examples, the score A 316a can be determined based on a heuristic and qualitative model using itemized inputs and relative weightings. A general formula to create an Internal Risk Rating (ranging from a low rating of 60 to a high rating of 100) can then be applied such as:

$$\text{Score } A \text{ Rating} = 100 - \sum_{k=1}^{N} W_k I_k$$

The weights, W, are applied across all firms although there is an ability to further segment weights (for example by industry or geography). By way of example, a risk rating may be lower for an institution that regularly pays the lowest price available and does not accurately outline contract deliverables, than an institution that is willing to pay more for better expertise with a well-documented contract that does not change throughout the duration of the contract. Similarly, an institution that consistently delays payments may have a higher risk score than an institution offering a discount on early payment. Such exemplary circumstances would be included in the qualitative supplier risk assessment 338.

In an example, the counterparty enterprise risk model 700 can generate the counterparty enterprise risk 316 in iterations such that the counterparty enterprise risk 316 is accurate. In this regard, the counterparty risk 216 that was generated from the score A 316a can become the counterparty enterprise risk, score B 316b. Score B 316b can then be received by the supplier variable module 312 to subsequently re-generate the counterparty enterprise risk 316. The iterations of generating the counterparty enterprise risk 316 can be repeated until a sufficiently accurate counterparty enterprise risk 316 is generated.

The counterparty enterprise risk model 700 can be configured to generate the counterparty enterprise risk 316 at discrete intervals within the duration of the contract, such as every week, at the end of each phase of the contract, or simply at the beginning and end of the contract. Alternatively, the counterparty enterprise risk model 700 can be configured to continuously monitor the counterparty enterprise risk 316 and notify a user of the system when the counterparty enterprise risk 316 passes a threshold value. In yet another example, the counterparty enterprise risk model 700 can be configured to continuously generate the counterparty enterprise risk 316 such that a user of the system 100 can access the counterparty enterprise risk 316 information in real time.

The counterparty enterprise risk model 700 can also convert the counterparty enterprise risk 316 into default probabilities and recovery rates based on historical data included in the user historical data set 302, the global historical data set 304, and the external data set 306. The counterparty enterprise risk model 700 can also map the default probabilities and recovery rates to produce a relatively static table representing the counterparty enterprise risk 316 values and the corresponding default probabilities and recovery rates. The following table is an example of such a static table:

| Internal Rating | Expected Outcomes | | Stressed Outcomes | |
| --- | --- | --- | --- | --- |
| | Default Probability | Recovery Rate | Default Probability | Recovery Rate |
| 91+ | .25% | 95% | 5% | 35% |
| 88-90 | .4% | 92% | 6% | 22% |
| 82-87 | 1% | 87% | 8% | 18% |
| . . . | . . . | . . . | . . . | . . . |
| 61-64 | 15% | 25% | 56% | 0 |
| 60 or less | 22% | 2% | 78% | 0 |

The supplier variable module 312 may be configured to update the static table over time, for example each financial quarter. The static table allows users of the system 100 to easily predict the default probability and the recovery rate based on the counterparty enterprise risk 316 that is generated throughout the duration of the contract.

The counterparty enterprise risk model 700 can also be configured to generate recommendations based on the counterparty enterprise risk 316. The recommendations can include areas of the contract to monitor, such as an institution defaulting on a payment of the contract, or risk flags. The recommendations generated by the counterparty enterprise risk model 700 may be included in the set of recommendations generated in the method 200.

Figure 8:
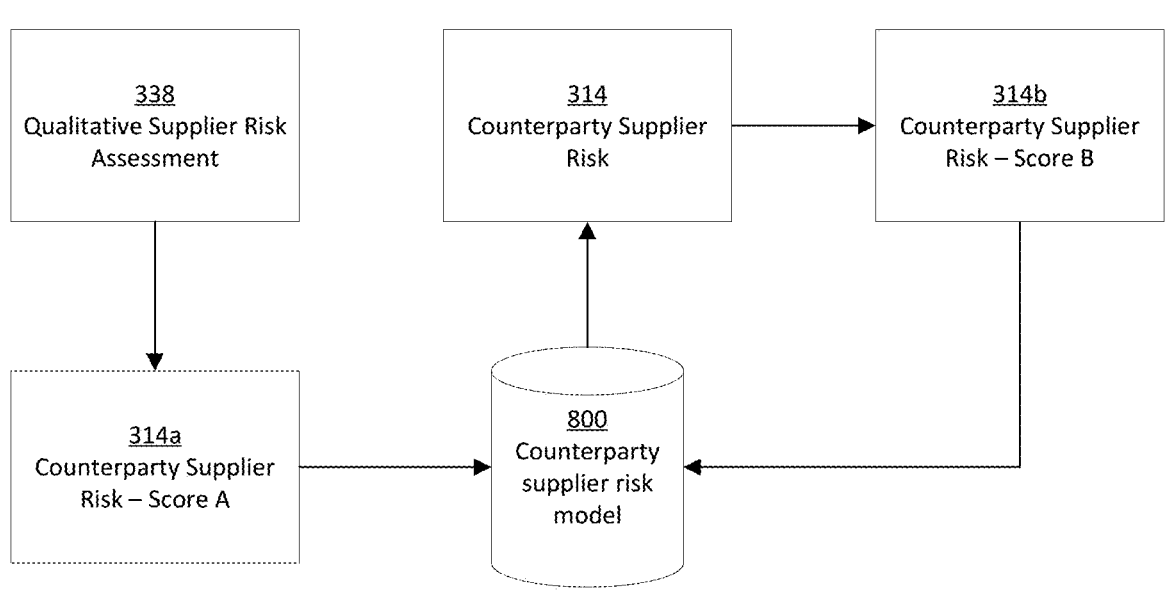
FIG. 8 is a schematic diagram of an exemplary counterparty supplier risk model used by the supplier variable module.
Figure 9:
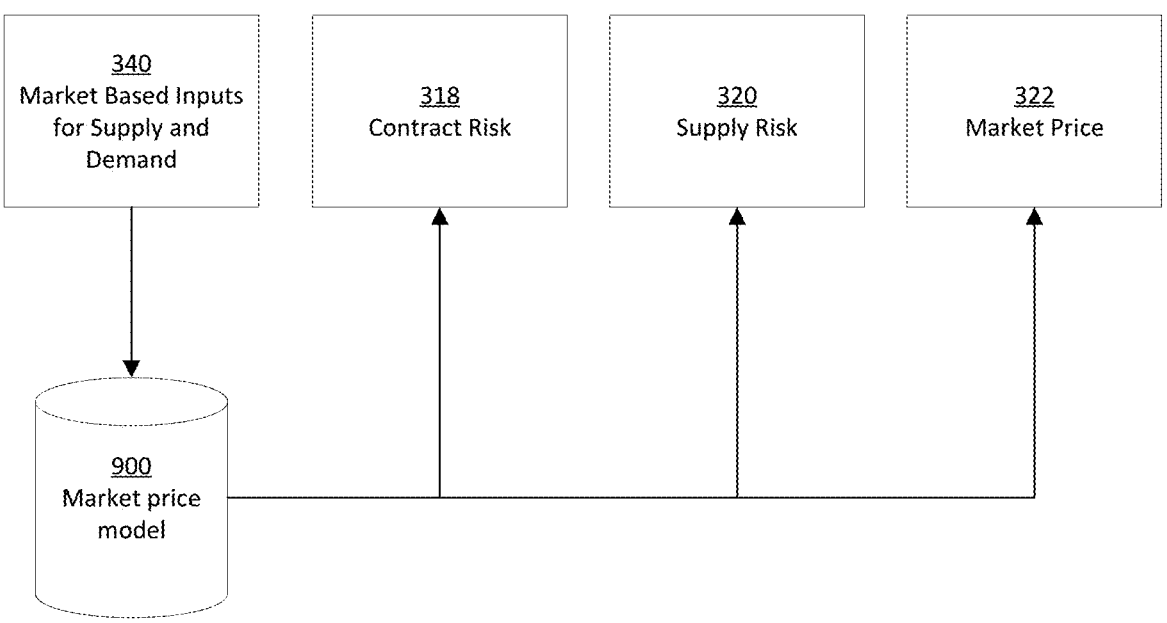
FIG. 9 is a schematic diagram of an exemplary market price model used by the supplier variable module.

FIG. 8 illustrates an example embodiment of the counterparty supplier risk model 800 that can be used by the supplier variable module 312 to generate the counterparty supplier risk 314. Counterparty supplier risk 314 assessment is similar to the counterparty enterprise risk 316, but relates to the risk associated with the supplier of a contract.

The server 102 can be configured to receive a qualitative supplier risk assessment 338. In some examples, the qualitative supplier risk assessment 338 is stored in the local database 104 or the remote database 106. In other examples, a user may send the qualitative supplier risk assessment 338 directly to the server 102 from the electronic devices 108. For example, there may be a web-application that can be accessed on a user's electronic device 108 that includes a form with all the necessary information to be included in the qualitative supplier risk assessment 338, and upon filling in the form, the user can send the information directly to the server 102.

Information included in the qualitative supplier risk assessment 338 can be information that is included in traditional supplier risk assessments. Traditional supplier risk assessments typically use a list of questions and risk weights based on qualitative assessment risk scores given to key areas. Areas that pose a moderate to high-risk rating may be rejected, monitored, or re-assessed before or after the parties enter into the contract. Standard areas of assessment that can be included in the qualitative supplier risk assessment 338 may include: compliance, strategic risk, subcontractor risk, concentration risk, cyber risk, country risk, external credit risk, operational risk, reputational risk or legal risk. Other information that may be included in the qualitative supplier risk assessment 338 includes the current MTM of all supplier contracts, the potential future exposure, the recovery rate of each contract, updated information about the supplier (e.g., information that changes such as number of skilled employees or credit score of the supplier), payment history of the supplier, internal ratings and default probability. The qualitative supplier risk assessment 338 can be populated with information from user historical data set 302, the global historical data set 304, or the external data set 306, where available. Otherwise, information to be included in the qualitative supplier risk assessment 338 may be input into the electronic devices 108 by a user and subsequently sent directly to the server 102 to be compiled into the qualitative supplier risk assessment 338.

In some examples, counterparty supplier risk 314 can in the format of MTM. The counterparty supplier risk 314 may vary over time and can be generated based on the following equation:

$$\text{Counterparty Supplier Risk}\,(t) = \text{Current Exposure}\,(t) +$$
$$\text{Potential Future Exposure}\,(t) + \text{Settlement Risk}\,(t) - \text{Collateral}(t)$$

Where the Current Exposure(t) is the MTM at time=t for all supplier contracts; the Potential Future Exposure(t) is a function of the forward volatility of the constituent supplier contracts and the interaction of those processes, comprising a forecast measure of the MTM of all supplier contracts at time=t; the Settlement Risk(t) is the risk of forgone contractual obligations resulting from default (for example, if a payment is 'net 30' and the supplier defaults, then the risk is 30 days of contract execution); and Collateral(t) varies depending on the contract and parties to the contract but may include any other factors that mitigate the counterparty supplier risk 314. The counterparty supplier risk 314 can be represented as an individual risk rating value. Alternatively, the counterparty supplier risk 314 may be represented as a heat map, indicating the likelihood and level of impact.

In an example, the counterparty supplier risk model 800 can generate the counterparty supplier risk 314 in iterations such that the counterparty supplier risk 314 is accurate. In this regard, the counterparty supplier risk 314 that was generated from the score A 314*a* can become the counterparty supplier risk, score B 314*b*. Score B 314*b* can then be received by the supplier variable module 312 to subsequently re-generate the counterparty supplier risk 314. The iterations of generating the counterparty supplier risk 314 can be repeated as required and with each additional contract.

The counterparty supplier risk model 800 can be configured to generate the counterparty supplier risk 314 at discrete intervals within the duration of the contract, such as every week, at the end of each phase of the contract, or simply at the beginning and end of the contract. Alternatively, the counterparty supplier risk model 800 can be configured to continuously monitor the counterparty supplier risk 314 and notify a user of the system when the counterparty supplier risk 314 passes a threshold value. In yet another example, the counterparty supplier risk model 800 can be configured to continuously generate the counterparty supplier risk 314, such that a user of the system 100 can access the counterparty supplier risk 314 information when desired and in real time.

In some examples, it may be desirable to perform an additional qualitative supplier risk assessment 338, such as at certain milestones of the contract, or upon notice of an event such as default in payment. In such an instance, the server 102 may automatically generate a new qualitative supplier risk assessment 338 based on the information in the user historical data set 302, the global historical data set 304 and the external data set 306. In other examples, a user may input the updated information to be included in the qualitative supplier risk assessment 338 directly to the server 102 from the electronic devices 108. When an additional qualitative supplier risk assessment 338 is generated, the supplier variable module 312 can generate a new counterparty supplier risk 314.

In addition to outputting the counterparty supplier risk 314, the supplier variable module 312 can also be configured to output the risk scores associated with the various categories of risk included in the qualitative supplier risk assessment 338. By including the risk scores of the various categories of risk, a user can understand how the overall counterparty supplier risk 314 was determined.

The counterparty supplier risk model 800 can also be configured to generate recommendations based on the counterparty supplier risk 314 or the various categories of risk included in the qualitative supplier risk assessment 338. The recommendations can include areas of the contract to monitor, such as an institution defaulting on a payment of the contract, or risk flags. The recommendations generated by the counterparty supplier risk model 800 may be included in the set of recommendations generated in the method 200.

FIG. 9 illustrates an example embodiment of the market price model 900 that can be used by the supplier variable module 312 to generate the market price 322 (also referred to as the rate card). In some examples, market price 322 may be determined by a third party to the system and thus the market price 322 may be received from the remote database 106. In other examples, there is a need to provide a market price model 900 which can assess the market price 322 and the marketplace based on supplier skillsets and quantifiable attributes of the suppler based on a certain timeframe.

Market price 322 may be more (or less) liquid and exhibit little or significant volatility depending on several factors. The market price model 900 can provide a consistent framework and can be used to price other suppliers by comparing the relative value, or basis, to pertinent underlying classes. For example, a supplier in one location may often be quoted as a premium to another, more universal location.

The market price 322 of supplier categories begins with a current rate card. The current rate card may include information on the known market price 322 of the supplier, based on information stored in the user historical data set 302, the global historical data set 304 and the external data set 306. In addition to the current rate card, other information may be received by the server 102 from the various data sets such as the most recent contract data, economic data (to compile a demand model), market forces (to compile a supply model), seasonality forecast and systemic trends.

The market price model 900 can also receive market based inputs for supply and demand 340. Using the current rate card and the market based inputs for supply and demand 340, the market price model 900 can generate a current market price 322. In one example, an initial spot and forward pricing model for a supplier category can begin with the current rate card with the addition of a simple geometric Brownian motion stochastic process in order to account for nominal price growth (inflation) and randomness.

As more users, such as suppliers and enterprises, use the market price model 900, the market price model 900 may improve and include underlying factors such as supply and demand or market depth. Market price 322 of certain supplier may be more or less liquid or exhibit idiosyncratic patterns (seasonality or other trends). For example, IT services in an under-serviced market or providing a very rare professional good (e.g. specialized equipment).

The market price model 900 can also be configured to generate recommendations based on the market price 322. The recommendations can include current and forecast market price 322 for a supplier, recommendations for comparative pricing for related products or services, price-based attribution, or supply and demand. The recommendations generated by the market price model 900 may be included in the set of recommendations generated in the method 200.

The outputs of the various models described in FIGS. 3, 4, 5, 6, 7, 8, and 9 may be expressed in various manners. In some examples, the outputs may be expressed in terms of a price, for example the market price model 900 may frequently generate a market price 322 in terms of dollars per unit. In other examples, the outputs may be expressed as coordinates on a heat map. A heat map can represent the various risk factors, such as those considered in counterparty enterprise model 600 or counterparty supplier model 600. By outputting the counterparty enterprise risk 316 and the counterparty supplier risk 314 as heat map coordinates, a user of the system 100 can understand the counterparty enterprise risk 316 and the counterparty supplier risk 314 in terms of likelihood and harm of the risk. In other examples, the outputs may be in the form of a score out of 100 or a letter grade. The standard scoring out of 100 or letter grade scale may be entered into the supplier variable module 312 by the user, or they may be generated by the supplier variable module 312.

FIGS. 10, 11, 12, and 13 provide exemplary tables illustrating the inputs and outputs of the various modules and models described in FIGS. 3, 4, 5, 6, 7, 8, and 9 at various times throughout the contract. In FIGS. 10, 11, 12, and 13, Model 1 corresponds to the market price model 900 in FIG. 9; Model 2.1 corresponds to the counterparty supplier risk model 800 in FIG. 8; Model 2.2 corresponds to the counterparty enterprise risk model 700 in FIG. 7; Model 3 corresponds to the contract risk model 600 in FIG. 6; Model 4 corresponds to the supply risk model 500 model in FIG. 5; and Model 5 corresponds to the enterprise supplier risk model 400 in FIG. 4. The tables in FIGS. 10, 11, 12, and 13 do not include actual values generated by the models, but are meant to illustrate the individual variable breakdowns, changes in time, and final value of the main variable (risk) based on the individual variable breakdowns.

FIG. 10 is a table illustrating exemplary inputs and outputs of the system 100 at the beginning of a six month contract, i.e. at 0 months into the contract. FIG. 11 shows a similar table to FIG. 10, but the table in FIG. 11 represents 1 month into the contract. Similarly, FIG. 12 shows the same table at 3 months into the contract and FIG. 13 shows the table at 6 months into the contract, i.e. at the end of the contract.

In the tables of FIGS. 10, 11, 12, and 13 the market price model 900 is represented in the first row, titles "Model 1: Rate Card" and receives pricing factors, such as the market based inputs for supply and demand 340 in order to output the market price 322, represented by a currency value. The market price 322 can then be converted into a score, for example a value out of 100. By converting the market price 322 into a score out of 100, the user evaluating the risk associated with the contract can quickly and easily understand the conclusions of the models, without needing to analyze the various actual outputs of the models.

Similarly, the counterparty supplier risk model 800 and the counterparty enterprise risk model 700 are shown in the second and third rows of the tables of FIGS. 10, 11, 12, and 13. These models receive assessment factors, such as the qualitative supplier risk assessment 338. These models can then generate heat map position coordinates. The outcomes of a risk assessments, such as the assessment of the counterparty enterprise risk 316 and the counterparty supplier risk 314, are often represented as heat maps, comparing and combining the potential impact of a risk and the likelihood of such a risk occurring. The heat map scores can then be converted into a risk score out of 100, similar to the market price 322.

The contract risk model 600 is shown in the fourth row of the tables of FIGS. 10, 11, 12, and 13. The contract risk model 600 receives, as inputs, the counterparty risk 328 and the contract attributes 332. The model uses the inputs to generate the contract risk 318 in the form of contract decomposition and attribution. The contract decomposition and attribution value can also be converted into a risk score out of 100.

The supply risk model 500 is show in the fifth row of the tables of FIGS. 10, 11, 12, and 13. The supply risk model receives the market price 322, the market based inputs 330 and the contract attributes 332 as inputs and uses the inputs to generate the supply risk 320. The supply risk 320 is represented as the price by tenor. The supply risk 320 can also be converted into a supply risk score out of 100.

Finally, the enterprise supplier risk model 400 is shown in the sixth row of the tables of FIGS. 10, 11, 12, and 13. The enterprise supplier risk model 400 receives the values from the various models, including counterparty risk 328, contract risk 318, supply risk 320, and market price 322. The enterprise supplier risk model 400 can then generate the enterprise supplier risk 324 which comprises an aggregate of all of the various risk calculations performed by the various models. The enterprise supplier risk 324 may represent the overall risk value of the entity being assessed and is represented by a score out of 100.

At the beginning of the contract, as shown in the table for FIG. 10, there will be no change in value as this is the first assessment of each of the variables. However, in FIG. 11, the table includes the values previously generated by the various models as "Output Value 2". In addition to receiving the variables in the column "Output Value 2", the models can receive the same inputs as they did for the initial assessment. Some of these inputs may be the same, for example if none of the contract terms have been altered, the contract attributes 332 may be the same as the initial assessment. However, in other examples, the inputs may also have changed since the initial assessment, for example, due to shifting global marketplace conditions. The models can then compare the new output ("Output 3") and compare the new output to the initial assessment in the "Change of Value" column. Finally, the outputs can be converted into scores out of 100 and compared to the initial risk scores provided in FIG. 10, allowing the user evaluating the supplier to quickly and easily compare the risk of the contract and how it has changed over time.

Similar iterations of the models generating the variables are represented in FIGS. 12 and 13. While FIGS. 11, 12 and 13 comprise the outputs of the models at 1 month, 3 months and 6 months into the contract, there may be any number of evaluations of the variables at any given time throughout the duration of the contract. In general, the outputs may be compared to the most recent assessment. For example, in FIG. 12, the new outputs, as depicted in the "Output 4"

column, would be compared to those represented in FIG. 11. However, in other examples it may be useful to compare the updated variables to their initial values, or to the values at other times throughout the contract.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprises of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover all suitable changes in technology.

Certain adaptations and modifications of the described embodiments can be made. Therefore, the above discussed embodiments are considered to be illustrative and not restrictive.

What is claimed is:

1. A computer-implemented method comprising:
receiving, by a marketplace application, sets of data, the sets of data comprising i) user historical data in relation to one or more parties to one or more respective contracts executed through the marketplace application, the one or more parties including at least one of one or more approved suppliers, and the user historical data including qualitative supplier risk assessment information, ii) a global historical data set, and iii) an external data set, wherein an accessible local database or a remote database includes the sets of data and a list of the one or more approved suppliers for each enterprise that is a user of the marketplace application;
training, by a processor using a training data set, a first set of risk models in a neural network including multiple layers of neurons, each neuron having a weight value and receiving inputs from a previous layer of the neural network, the training data set including portions of information contained in the user historical data, the global historical data set, and the external data set, the training of the first set of risk models including adjusting one or more weights of the first set of risk models;
receiving or deriving, by a supplier variable module of the marketplace application, including the first set of risk models: contract attributes of a supplier contract or a potential supplier contract;
generating, by the supplier variable module including the first set of risk models, based on the sets of data and the contract attributes: a first set of outcomes for the supplier contract or the potential supplier contract;
generating, by the marketplace application, at least one recommendation based on the first set of outcomes, the at least one recommendation directed to a risk mitigation action that when executed, causes a reduction or mitigation in risk associated with the supplier contract or the potential supplier contract; and
training the first set of risk models in the neural network using data associated with updated user historical data, updated global historical data, updated external data and the first set of outcomes, to generate a second set of risk models by adjusting one or more second weights of the first set of risk models.

2. The method of claim 1, further comprising:
receiving or deriving, by the supplier variable module of the marketplace application, including the second set of risk models: updated contract attributes of the supplier contract or the potential supplier contract; and
generating, by the supplier variable module including the second set of risk models, based on the sets of data including the updated user historical data, the updated global historical data, the updated external data and the updated contract attributes: a second set of outcomes for the supplier contract or the potential supplier contract.

3. The method of claim 1, wherein the marketplace application includes one or more supplier variable modules including the supplier variable module, wherein the marketplace application is a global marketplace representing a multi-tenanted marketplace environment and including one or more sub-marketplaces of approved suppliers, each of the one or more sub-marketplaces of approved suppliers respectively including one of the one or more supplier variable modules including a respective set of supplier-specific risk models for a respective enterprise that is a user of the marketplace application.

4. The method of claim 3, wherein the method further comprises:
updating the sets of data based on the one or more sub-marketplaces of approved suppliers.

5. The method of claim 3, further comprising:
generating, by the one or more supplier variable modules of the one or more sub-marketplaces of approved suppliers, based on the sets of data: a set of outcomes for an approved supplier; and
monitoring, by the global marketplace, the set of outcomes for the approved supplier over time and across the one or more sub-marketplaces of approved suppliers.

6. The method of claim 3, wherein the global marketplace includes an industry risk model.

7. The method of claim 3, wherein the global marketplace includes a global market price model.

8. The method of claim 7, further comprising:
generating, by the one or more supplier variable modules of the one or more sub-marketplaces of approved suppliers, based on the sets of data: a set of outcomes for an approved supplier expressed in terms of price;
generating, by the global market price model, based on the set of outcomes for the approved supplier expressed in terms of price, a current rate card and market based inputs for supply and demand, a current market price for a supplier category.

9. The method of claim 8, wherein the global market price model receives, as input, the market based inputs for supply and demand, and wherein a market price estimate is generated using the current rate card with an addition of a geometric Brownian motion stochastic process.

10. The method of claim 8, wherein the current market price for the supplier category reflects a location of a supplier.

11. The method of claim 8, further comprising:

generating recommendations based on the current market price, the recommendations including at least one of:

a current and forecast market price for a supplier;

recommendations for comparative pricing for related products or services;

price-based attribution; or supply and demand.

12. The method of claim 8, wherein the one or more supplier variable modules comprises a plurality of supplier variable modules.

13. The method of claim 1, wherein the marketplace application includes one or more supplier variable modules including the supplier variable module, further comprising a further model generating and/or expressing outputs from the first set of outcomes from the one or more supplier variable modules.

14. The method of claim 13, wherein the further model is a price model.

15. The method of claim 13, further comprising training the further model.

16. The method of claim 13, wherein the one or more supplier variable modules comprises a plurality of supplier variable modules.

17. The method of claim 1, wherein the first set of outcomes for the supplier contract or the potential supplier contract includes a counterparty risk estimate, a contract risk estimate, a supply risk estimate, and a market price estimate and generating the first set of outcomes comprises:

generating, by a counterparty supplier risk model of the supplier variable module: a counterparty supplier risk estimate;

generating, by a counterparty enterprise risk model of the supplier variable module: a counterparty enterprise risk estimate;

wherein the supplier variable module includes a contract risk model configured to generate the contract risk estimate, wherein the supplier variable module includes a supply risk model configured to generate the supply risk estimate, wherein the supplier variable module includes a market price model configured to generate the market price estimate, and wherein the counterparty risk estimate includes the counterparty enterprise risk estimate and the counterparty supplier risk estimate.

18. The method of claim 17, wherein the counterparty enterprise risk model and the counterparty supplier risk model receive, as input, the qualitative supplier risk assessment information, and wherein the counterparty enterprise risk estimate is generated by aggregating one or more itemized inputs and relative risk weightings of the qualitative supplier risk assessment information, wherein the counterparty supplier risk estimate is generated according to the following equation:

$$\text{Counterparty Supplier Risk}\,(t) = \text{Current Exposure}\,(t) +$$
$$\text{Potential Future Exposure}\,(t) + \text{Settlement Risk}\,(t) - \text{Collateral}(t);$$

wherein Collateral(t) is a collateral.

19. The method of claim 17, wherein the counterparty risk estimate, the counterparty enterprise risk estimate, the counterparty risk estimate, the contract risk estimate, the supply risk estimate, and the market price estimate are respective time-variant supplier variables.

20. The method of claim 1, wherein the marketplace application is a web-based marketplace application.

21. The method of claim 1, further comprising:

generating, by the supplier variable module, the training data set;

wherein the training data set comprises the first set of outcomes and at least a portion of the sets of data.

22. The method of claim 21, further comprising training the supplier variable module with the training data set.

23. The method of claim 21, further comprising:

generating, by the supplier variable module, a testing data set; wherein the testing data set comprises at least a portion of the sets of data; and testing the supplier variable module with the testing data set.

24. A non-transitory computer readable memory containing instructions which, when executed by a processor of a marketplace application server, cause the processor to:

receive, by a marketplace application, sets of data, the sets of data comprising i) user historical data in relation to one or more parties to one or more respective contracts executed through the marketplace application, the one or more parties including at least one of one or more approved suppliers, and the user historical data including qualitative supplier risk assessment information, ii) a global historical data set, and iii) an external data set, wherein an accessible local database or a remote database includes the sets of data and a list of the one or more approved suppliers for each enterprise that is a user of the marketplace application;

train, by a processor using a training data set, a first set of risk models in a neural network including multiple layers of neurons, each neuron having a weight value and receiving inputs from a previous layer of the neural network, the training data set including portions of information contained in the user historical data, the global historical data set, and the external data set, the training of the first set of risk models including adjusting one or more weights of the first set of risk models;

receive or derive, by a supplier variable module of the marketplace application, including the first set of risk models: contract attributes of a supplier contract or a potential supplier contract;

generate, by the supplier variable module including the first set of risk models, based on the sets of data and the contract attributes: a first set of outcomes for the supplier contract or the potential supplier contract;

generate, by the marketplace application, at least one recommendation based on the first set of outcomes, the at least one recommendation directed to a risk mitigation action that when executed, causes a reduction or mitigation in risk associated with the supplier contract or the potential supplier contract; and train the first set of risk models in the neural network using data associated with updated user historical data, updated global historical data, updated external data and the first set of outcomes, to generate a second set of risk models by adjusting one or more second weights of the first set of risk models.

25. A system comprising:

a local database including first sets of data related to a supplier contract or a potential supplier contract;

a marketplace application server including a processor, the marketplace application server having access to a remote database including second sets of data related to the supplier contract or the potential supplier contract, the processor configured to:

receive, by a marketplace application, sets of data, the sets of data comprising i) user historical data in relation to one or more parties to one or more respective contracts executed through the marketplace application, the one or more parties including at least one of one or more approved suppliers, and the user historical data including qualitative supplier risk assessment information, ii) a global historical data set, and iii) an external data set, wherein an accessible local database or a remote database includes the sets of data and a list of the one or more approved suppliers for each enterprise that is a user of the marketplace application;

train, by a processor using a training data set, a first set of risk models in a neural network including multiple layers of neurons, each neuron having a weight value and receiving inputs from a previous layer of the neural network, the training data set including portions of information contained in the user historical data, the global historical data set, and the external data set, the training of the first set of risk models including adjusting one or more weights of the first set of risk models;

receive or derive, by a supplier variable module of the marketplace application, including the first set of risk models: contract attributes of a supplier contract or a potential supplier contract;

generate, by the supplier variable module including the first set of risk models, based on the sets of data and the contract attributes: a first set of outcomes for the supplier contract or the potential supplier contract;

generate, by the marketplace application, at least one recommendation based on the first set of outcomes, the at least one recommendation directed to a risk mitigation action that when executed, causes a reduction or mitigation in risk associated with the supplier contract or the potential supplier contract; and train the first set of risk models in the neural network using data associated with updated user historical data, updated global historical data, updated external data and the first set of outcomes, to generate a second set of risk models by adjusting one or more second weights of the first set of risk models.

* * * * *